United States Patent
Aoshima et al.

(10) Patent No.: US 6,908,712 B2
(45) Date of Patent: Jun. 21, 2005

(54) LITHIUM SECONDARY CELL

(75) Inventors: Takayuki Aoshima, Kanagawa (JP); Iwao Soga, Kanagawa (JP); Mitsuharu Kobayashi, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 148 days.

(21) Appl. No.: 10/227,812

(22) Filed: Aug. 27, 2002

(65) Prior Publication Data

US 2003/0031923 A1 Feb. 13, 2003

Related U.S. Application Data

(63) Continuation of application No. PCT/JP01/11486, filed on Dec. 26, 2001.

(30) Foreign Application Priority Data

Dec. 27, 2000 (JP) .................................. 2000-397318

(51) Int. Cl.$^7$ ............................ H01M 6/18; H01M 6/16
(52) U.S. Cl. ...................... 429/306; 429/326; 429/341; 429/317
(58) Field of Search ............................... 429/341, 326, 429/127, 94, 306, 317

(56) References Cited

U.S. PATENT DOCUMENTS

| | | | | |
|---|---|---|---|---|
| 5,455,128 A | * | 10/1995 | Tanaka | 429/221 |
| 5,783,333 A | * | 7/1998 | Mayer | 429/223 |
| 5,925,283 A | * | 7/1999 | Taniuchi et al. | 252/62.2 |
| 6,019,802 A | * | 2/2000 | Ishizuka et al. | 29/623.5 |
| 6,645,674 B2 | * | 11/2003 | Shin et al. | 429/231.95 |
| 2001/0018146 A1 | | 8/2001 | Shin et al. | |

FOREIGN PATENT DOCUMENTS

| | | |
|---|---|---|
| JP | 8-7922 | 1/1996 |
| JP | 8-37024 | 2/1996 |
| JP | 9-161845 | 6/1997 |
| JP | 10-12273 | 1/1998 |
| JP | 10-247517 | 9/1998 |
| JP | 2983205 | 11/1999 |
| JP | 2000-58117 | 2/2000 |
| JP | 2000-200588 | 7/2000 |
| JP | 2001-110443 | 4/2001 |
| JP | 2001-223023 | 8/2001 |

* cited by examiner

*Primary Examiner*—Patrick Joseph Ryan
*Assistant Examiner*—Julian Mercado
(74) *Attorney, Agent, or Firm*—Oblon, Spivak, McClelland, Maier & Neustadt, P.C.

(57) ABSTRACT

To improve an impregnation property of an electrolyte and the cycle characteristics, which have been a problem in the case of employing a casing having a variable shape. A lithium secondary cell comprising a casing having a variable shape, and a cell element having a positive electrode, a negative electrode and an electrolyte, sealed in the casing, wherein a compound represented by following formula (1) is contained in the lithium secondary cell:

$$A1\text{-}X\text{-}A2 \qquad (1)$$

(wherein X is a Group VI element in the periodic table, and A1 and A2 represent an aromatic group, provided that A1 and A2 may be the same or different, and may be connected each other to constitute a ring.)

2 Claims, 11 Drawing Sheets

(A) 40: Metal layer
41: Synthetic resin layer (B) 41: Synthetic resin layer
40: Metal layer
42: Synthetic resin layer 41: Synthetic resin layer
43: Adhesive agent layer
40: Metal layer
43: Adhesive agent layer
42

LITHIUM SECONDARY CELL

Continuation of prior International Application PCT/JP01/11486, filed Dec. 26, 2001.

TECHNICAL FIELD

The present invention relates to a lithium secondary cell, particularly, to a lithium secondary cell employing a casing having a variable shape.

BACKGROUND ART

A lithium secondary cell having a cell element comprising a positive electrode, a negative electrode and an electrolytic solution, accommodated in a casing, is known.

The most common lithium secondary cell employs, as a casing, a metal can made of a metal such as SUS and having rigidity. In such a lithium secondary cell, a cell element is accommodated in a casing so that its electrodes are sufficiently close to each other.

In recent years, instead of such a lithium secondary cell employing a metal can, a lithium secondary cell employing a sheathing member having a variable shape, which is made of laminated film comprising a gas barrier layer and resin layers provided on both sides of said gas barrier layer, as a casing, has been practically used. In such a lithium secondary cell, it becomes possible to reduce the weight of the sheathing member and to reduce the thickness of the lithium secondary cell, and it becomes possible to further reduce the size and weight of the lithium secondary cell, and further to improve the volume energy density and the weight energy density.

However, with such a lithium secondary cell employing a casing having a variable shape, the strength of the casing is weak as compared with a lithium secondary cell sealed in a stout metal can casing, whereby the closeness between the electrodes is poor, and there are new problems such as deterioration of the cycle characteristics and deterioration of impregnation with the electrolyte.

Namely, in a lithium secondary cell employing a casing having a variable shape, the closeness between the electrodes of the cell element is secured usually by the atmospheric pressure by reducing the pressure inside the casing. However, the atmospheric pressure does not provide a sufficient force to press the cell element from outside, and consequently, the closeness between the electrodes deteriorates, whereby the cycle characteristics tend to deteriorate. Especially, if the degree of the reduced pressure inside the variable shape casing lowers due to e.g. deterioration of a bonded portion of the variable shape casing by high temperatures, interfusion of moisture due to this deterioration, generation of a gas by the decomposition of the electrolytic solution, or in the case a low boiling point solvent is used, evaporation of the solvent, the closeness between the electrodes further lowers and the cycle characteristics significantly deteriorate.

Whereas, in a lithium secondary cell employing a metal can casing, the metal can casing having high rigidity strongly presses the cell element accommodated therein, and the closeness between the electrodes is sufficiently high.

Further, if the variable shape casing is employed, since the closeness between the electrodes is inferior as compared with in the case of using a metal can casing, the impregnation property of the electrolyte significantly influences the cell performance. Namely, in a cell employing a conventional metal can casing, as mentioned above, the metal can casing plays a role of pressing the cell element from outside, whereby the closeness between the electrodes is essentially high, and accordingly, the influence of deterioration of the impregnation property of the electrolyte to the cell performance is insignificant. However, in a cell employing a casing having a variable shape, closeness between the electrodes is relatively inferior, since such a casing has low rigidity as compared with the metal can casing, and consequently the impregnation property of the electrolyte significantly influences the cell performance.

Deterioration of the impregnation property of the electrolyte is remarkable particularly in a case where a non-fluid electrolyte having its own prescribed independence is used. A lithium secondary cell having a non-fluid electrolyte is produced usually via a step of impregnating e.g. electrodes with a solution containing an electrolytic solution, a monomer and a polymerization initiator, or with a solution containing an electrolytic solution and a polymer. However, the above-mentioned solution can hardly be impregnated into the electrodes, since it has a high viscosity as compared with an electrolytic solution alone. Accordingly, if a non-fluid electrolyte is used, impregnation into the electrodes of the electrolyte further tends to be insufficient.

Further, in a cell employing the casing having a variable shape, in order to avoid e.g. swelling of the cell due to evaporation of the solvent contained in the above-mentioned electrolytic solution, it is preferred to use a solvent having a high boiling point as the solvent for the electrolytic solution. However, a solvent having a high boiling point generally has high viscosity, and accordingly, there is a problem that if such a solvent having a high boiling point is used, the fluidity of the electrolytic solution lowers, and thereby the fluidity of the electrolyte lowers, whereby the impregnation property of the electrolyte becomes poor.

If the impregnation property of an electrolyte is poor, not only it takes a long time for the impregnation, but also the initial capacity of the cell becomes insufficient, or the rate characteristics or the initial characteristics tend to be poor.

The present invention has been made in consideration of the above-mentioned problems, and it is an object of the present invention to improve the cycle characteristics of a lithium secondary cell employing a casing having a variable shape, and to improve the impregnation property of the electrolyte thereby to improve e.g. the rate characteristics.

DISCLOSURE OF THE INVENTION

The present inventors have conducted extensive studies to achieve the above-mentioned object, and as a result, have found that by letting a specific compound such as an ether having an aromatic group, be present in the cell, the cycle characteristics of a lithium secondary cell sealed in a casing having a variable shape, are improved, and the impregnation property of the electrolyte is also improved. The present invention has been accomplished on the basis of these discoveries.

Namely, the gist of the present invention resides in a lithium secondary cell comprising a casing having a variable shape, and a cell element having a positive electrode, a negative electrode and an electrolyte, sealed in the casing, wherein a compound represented by following formula (1) is contained in the lithium secondary cell:

$$A1\text{-}X\text{-}A2 \qquad (1)$$

(wherein X is a Group VI element in the periodic table, and A1 and A2 represent an aromatic group, provided that A1 and A2 may be the same or different, and may be connected to each other to constitute a ring.)

In the present invention, by letting the lithium secondary cell contain a compound represented by the above-mentioned formula (1), not only the cycle characteristics are improved, but also the impregnation of the electrolyte into the electrodes and spacers sandwiched by the electrodes, and accordingly, the rate characteristics and initial efficiency, are also remarkably improved. Among the above-mentioned improvements, the reason for the improvement of the cycle characteristics is not clearly understood, but the reason for the improvement for the impregnation property of the electrolyte is considered to be such that the compound represented by the above-mentioned formula (1) plays a role of a surface active agent.

Japanese Patent 2,983,205 and JP-A-2001-223023 introduce a technique of incorporating to an electrolytic solution a compound similar to the compound represented by the above-mentioned formula (1) used in the present invention. However, in each of the above documents, a lithium secondary cell specifically disclosed is a cylindrical cell or a prismatic cell (a cell employing a metal can casing), whose casing material is apparently different from that of the lithium secondary cell accommodated in a variable shape casing employed in the present invention. And in the technique described in the above-mentioned patent publications, there is no such a problem as in the present invention, since the cylindrical cell or the prismatic cell employs a casing having high rigidity. Further, in each of the above-mentioned documents, the purpose of incorporating to the electrolytic solution the compound similar to the compound represented by the above-mentioned formula (1), is to improve the safety of the lithium secondary cell. On the other hand, in the present invention, the compound represented by the above-mentioned formula (1) is incorporated to the lithium secondary cell in order to prevent deterioration of the cycle characteristics due to lowering of the closeness between the electrodes, and to prevent lowering of the impregnation property of the electrolyte. Therefore, the present invention is different from the technology described in the above patent publications in terms of all of the purpose, the construction and the effect.

EXPLANATION OF THE REFERENCE NUMERALS

Figure 1:
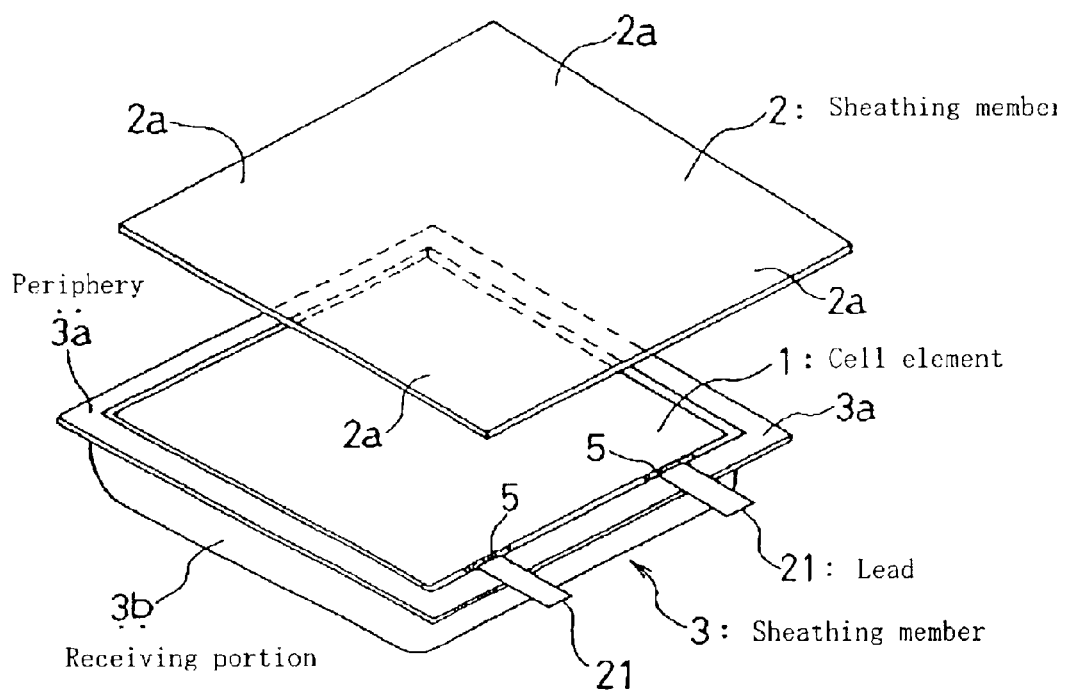
FIG. 1: An exploded perspective view of a cell according to an embodiment.

1: cell element
2, 3, 6, 7, 8: sheathing member
4a, 4b: tab
4A, 4F: bonded portion
4B, 4G: packing portion
5: insulating material
11: positive electrode
11a: positive electrode active material
12: negative electrode
12b: negative electrode active material
13: non-fluid electrolyte layer
15a: positive electrode current collector
15b: negative electrode current collector
21: lead
22: positive electrode current collector
23: positive electrode active material
24: spacer (electrolyte layer)
25: negative electrode active material
26: negative electrode current collector
40: metal layer
41, 42: synthetic resin layer
43: adhesive layer
50: injecting device
51: nozzle

BEST MODE FOR CARRYING OUT THE INVENTION

In the present invention, a compound represented by the following formula (1) is incorporated to be present in the cell:

$$A1\text{-}X\text{-}A2 \tag{1}$$

In the formula (1), X is a Group VI element in the periodic table, preferably oxygen or sulfur, more preferably oxygen. Each of A1 and A2 independently represents a group having an aromatic ring such as a phenyl group, a naphthyl group or an anthryl group, preferably a phenyl group or a naphthyl group, more preferably a phenyl group. In this case, a part of hydrogen atoms in the aromatic ring may be substituted by a substituent such as a linear, branched or cyclic alkyl group, a linear, branched or cyclic alkenyl group, an aryl group, a heterocyclic group, an alkoxy group, an aryloxy group, a heterocyclic oxy group or a halogen atom. Here, the number of carbon atoms in the linear, branched or cyclic alkyl group, the linear, branched or cyclic alkenyl group, the aryl group, the heterocyclic group, the alkoxy group, the aryloxy group or the heterocyclic oxy group, which can be used as a substituent, is preferably at most 15, more preferably at most 10, still more preferably at most 5. Further, a hydrogen atom bonded to the above linear, branched or cyclic alkyl group, the linear, branched or cyclic alkenyl group, the aryl group, the heterocyclic group, the alkoxy group, the aryloxy group or the heterocyclic oxy group, may be substituted by a halogen atom.

The linear, branched or cyclic alkyl group, as a specific substituent, may, for example, be a methyl group, an ethyl group, a n-propyl group, an i-propyl group, a n-butyl group, a sec-butyl group, a t-butyl group, a n-pentyl group, a n-hexyl group, a cyclopropyl group, a cyclobutyl group, a cyclopenthyl group or a cyclohexyl group. Further, the linear, branched or cyclic alkenyl group which is useful as the substituent, may, for example, be a vinyl group, a propenyl group, a butenyl group or a hexenyl group. Further, the aryl group useful as the substituent, may, for example, be a phenyl group or a naphthyl group. Further, the heterocyclic group useful as the substituent, may, for example, be a pyridyl group, a thiazolyl group, a benzothiazolyl group, an oxazolyl group, a benzoxazolyl group or a benzofuranyl group. Furthermore, the alkoxy group useful as the substituent, may, for example, be a methoxy group, an ethoxy group, an n-propoxy group, an i-propoxy group or an n-butoxy group. Further, the aryloxy group useful as the substituent, may, for example, be a phenoxy group or a naphthyloxy group. Furthermore, the heterocyclic oxy group useful as the substituent, may, for example, be a pyridyloxy group, a furyloxy group or a thiazolyloxy group. Further, the halogen atom useful as the substituent, may, for example, be fluorine, chlorine or bromine.

A1 and A2 may be connected to each other to constitute a ring. Namely, A1 and A2 are connected to each other via an element X, and besides this connection, A1 and A2 may be connected to each other directly or via a single or multiple atoms to constitute a ring including the element X as a whole.

The boiling point of the compound represented by the formula (1) under atmospheric pressure, is usually at least 100° C., preferably at least 120° C., more preferably at least 150° C. If the boiling point is low, the pressure inside the variable shape casing is increased by the evaporation, whereby the cell tends to swell and be deformed. Such swelling is likely to occur especially under a high temperature environment or when the cell is overcharged, and accordingly, the boiling point is preferably as high as possible to secure the cell's high temperature storage characteristics or the safety against overcharge. However, since a compound having a very high boiling point is practically difficult to obtain, the boiling point is usually at most 300° C.

As a specific example of the compound represented by the formula (1), phenyl ether, naphthyl ether, diphenyl sulfide, bis(p-tolyl) ether, bis(p-tolyl) sulfide, bis(p-fluorophenyl) ether, bis(p-fluorophenyl) sulfide, bis(p-chlorophenyl) ether, diphenoxybenzene, dibenzofuran, 1,4-dibenzodioxane or xanthene may be mentioned. Among these, particularly, phenyl ether, diphenyl sulfide or dibenzofuran is preferred, and phenyl ether is most preferred. Of course, a plurality of compounds represented by the above-mentioned formula (1) may be used in combination.

By the presence of a compound represented by the above-mentioned formula (1) in the cell, the impregnation property of the electrolyte of the cell and the cycle characteristics can be improved. Though the effect is not clearly understood, the reason for the improvement of the impregnation property of the electrolyte is considered to be such that the above-mentioned compound is a highly hydrophobic compound having an aromatic group and a Group VI element, and accordingly has high affinity with cell members (such as electrodes or spacers) which usually have a hydrophobic property. On the other hand, if the hydrophobic property is too high, the affinity with an electrolyte having a high hydrophilic property is generally poor. However, since the above-mentioned component also has a proper hydrophilic property, it is presumed that the balance of both properties generates an effect to increase the impregnation property of the electrolyte.

The compound represented by the formula (1) is contained preferably in the electrolyte in the cell element. In this case, if the compound is incorporated to be present uniformly in the electrolyte, the effect of the present invention will be distinctly observed. For example, in a case where an electrolyte containing an electrolytic solution having a lithium salt dissolved in a non-aqueous type solvent is used as the electrolyte, the above compound becomes uniformly present in the electrolyte if one soluble in the electrolytic solution is used as the above compound.

The amount of the compound represented by the formula (1) present in the lithium secondary cell, may suitably be selected depending on the type of the compound or the property required. The cycle characteristics tend to be improved as the amount increases. However, if the amount is too large, no further significant improvement of the cycle characteristics tends to be observed, and there may be an adverse effect on other cell characteristics. Further, if the amount is small, the cycle characteristics tend to decrease. As the amount, based on the weight of the electrolytic solution, the compound represented by the formula (1) is incorporated to be present usually at most 15 wt %, preferably at most 11 wt %, more preferably at most 10 wt %, still more preferably at most 8 wt %, particularly preferably at most 7.6 wt %, most preferably at most 7.5 wt %, and usually at least 1 wt %, preferably at least 2 wt %, more preferably at least 4 wt %, still more preferably at least 5.5 wt %, most preferably at least 6 wt %.

Here, the weight of an electrolytic solution means the amount including the weight of the above-mentioned compound. Namely, in a case where the electrolytic solution consists of a lithium salt, a non-aqueous type solvent and the compound represented by the above-mentioned formula (1), the total weight having the weights of the respective components summed up, is the weight of the electrolyte.

In a case where the electrolyte containing an electrolytic solution having a lithium salt dissolved in a non-aqueous type solvent is used, the most preferred amount is at least 5 wt % and at most 7.5 wt % based on the weight of the electrolytic solution.

The cell element of the present invention has a positive electrode, a negative electrode and an electrolyte. Each of the positive electrode and the negative electrode usually includes a current collector and an active material layer provided thereon.

As the positive current collector, various metals such as aluminum, nickel, SUS, etc. may be used, but preferred is aluminum. The thickness of the current collector is usually at least 1 $\mu$m, preferably at least 3 $\mu$m, more preferably at least 5 $\mu$m, and usually at most 30 $\mu$m, preferably at most 25

μm, more preferably at most 20 μm. From the viewpoint of the volume energy density and the weight energy density, the thinner the thickness of the positive electrode current collector, the better. However, if it is too thin, there may be a case such that the handling becomes difficult in terms of e.g. strength at the time of producing a lithium secondary cell. The current collector may usually be one having a sheet shape such as a metal foil, or one having a mesh shape such as a punching metal. The surface of the current collector may be subjected to surface roughening treatment in advance as the case requires.

The active material layer provided on the current collector usually includes an active material. As the positive electrode material, various types of inorganic compounds such as a transition metal oxide, a compound oxide of lithium and a transition metal and a transition metal sulfide, may be mentioned. Here, as the transition metal, Fe, Co, Ni or Mn may, for example, be used. Particularly, a transition metal oxide powder, such as $MnO$, $V_2O_5$, $V_6O_{13}$ or $TiO_2$, a compound oxide powder of lithium and a transition metal, such as lithium-nickel compound oxide, lithium-cobalt compound oxide or lithium-manganese compound oxide, a transition metal sulfide powder, such as $TiS_2$, $FeS$ or $MOS_2$, may be mentioned.

These compounds may be ones having elements partially substituted in order to improve the characteristics. Further, an organic compound such as polyaniline, polypyrrole, polyacene, a disulfide type compound, a polysulfide type compound or a N-fluoropyridinium salt, may also be used. These inorganic compounds and organic compounds may be used as a mixture. The particle diameter of the positive electrode active material is usually from 1 to 30 1 μm, preferably from 1 to 10 μm. Cell performance such as rate characteristics or cycle characteristics tends to decrease when the particle diameter is too large or too small.

Among these positive electrode active materials, preferred is a compound oxide of lithium and a transition metal, particularly, a lithium-nickel compound oxide such as $LiNiO_2$, a lithium-cobalt compound oxide such as $LiCoO_2$, or a lithium-manganese compound oxide such as $LiMn_2O_4$.

More preferred is to use a lithium-cobalt compound oxide and/or a lithium-nickel compound oxide as the positive electrode active material. By using these positive electrode active materials, the effect of the present invention i.e. the improvement of the impregnation property of the electrolyte, will be distinctly observed.

The lithium-cobalt compound oxide has a flat discharge curve and thus is a useful positive electrode active material excellent in the rate characteristics. As the lithium-cobalt compound oxide, $LiCoO_2$ having a layer structure may, for example, be mentioned. Further, the lithium-cobalt compound oxide may be one wherein a part of the sites occupied by Co, is substituted by an element other than Co. By such substitution of the Co sites by another element, the cycle characteristics or the rate characteristics of the cell may sometimes be improved. When a part of the sites occupied by Co, is substituted by an element other than Co, the substituting element may, for example, be Al, Ti, V, Cr, Mn, Fe, Li, Ni, Cu, Zn, Mg, Ga, Zr, Sn, Sb or Ge, and is preferably Al, Cr, Fe, Li, Ni, Mg, Ga, Zr, Sn, Sb or Ge, more preferably Al, Mg, Zr or Sn. The Co sites may be substituted by two or more types of other elements.

When a substituting element substitutes the Co sites its proportion is usually at least 0.03 mol %, preferably at least 0.05 mol %, against Co element, and usually at most 30 mol %, preferably at most 20 mol %, against Co element. If the proportion of substitution is too small, the improvement of the stability may not be sufficient, and if it is too large, the capacity may decrease when a cell is constituted.

The lithium-cobalt compound oxide is usually represented by $LiCoO_2$ as a basic composition before charging, but as mentioned above, a part of Co sites may be substituted by other elements. Further, in the above-mentioned composition formula, there may be a small amount of oxygen deficiency or indefiniteness, and a part of oxygen sites may be substituted by sulfur or a halogen element. Further, in the above-mentioned composition formula, the amount of lithium may be made to be excess or deficient.

The specific surface area of the lithium-cobalt compound oxide is usually at least 0.01 $m^2/g$, preferably at least 0.1 $m^2/g$, more preferably at least 0.4 $m^2/g$, and usually at most 10 $m^2/g$, preferably at most 5.0 $m^2/g$, more preferably at most 2.0 $m^2/g$. If the specific surface area is too small, the rate characteristics are lowered and the capacity is also lowered in some cases, and if it is too large, an undesirable reaction with e.g. the electrolytic solution may be induced, and the cycle characteristics may be lowered. The measurement of the specific surface area is according to BET method.

The average particle diameter of the lithium-cobalt compound oxide is usually at least 0.1 μm, preferably at least 0.2 μm, more preferably at least 0.3 μm, most preferably at least 0.5 μm, and usually at most 300 μm, preferably at most 100 μm, more preferably at most 50 μm, most preferably at most 20 μm. If the average particle diameter is too small, the cell's cycle deterioration may become large, or a safety problem may occur, and if it is too large, the internal resistance of the cell becomes large, and it tends to be difficult to obtain a sufficient output.

The lithium-nickel compound oxide is a useful positive active material, since it has a large current capacity per unit weight, whereby a large cell capacity can be obtained. The lithium-nickel compound oxide is an oxide containing at least lithium and nickel. As the lithium-nickel compound oxide, a lithium-nickel compound oxide such as $LiNiO_2$ having a layer structure of e.g. a α-$NaCrO_2$ structure, is preferred.

As the particular composition, $LiNiO_2$, $Li_2NiO_2$ or $LiNi_2O_4$ may, for example, be mentioned. In this case, the lithium-nickel compound oxide may be one wherein a part of the sites occupied by Ni is substituted by an element other than Ni. By substituting a part of Ni sites by another element, the stability of the crystal structure can be improved, and lowering of the capacity, induced by the movement of a part of Ni elements to the Li sites at the time of repeated charge-discharge operation, is inhibited, whereby the cycle characteristics are also improved. Further, by substituting a part of Ni sites by an element other than Ni, the starting temperature of an exothermic reaction measured by DSC (Differential Scanning Calorimetry) shifts to a higher temperature side, whereby a heat-induced overdrive reaction of the lithium-nickel compound oxide is prevented even if the cell temperature rises, and consequently, the safety during the storage at a high temperature can be improved.

When a part of sites occupied by Ni, is substituted by an element other than Ni, the element (hereinafter referred to as the substituting element) may, for example, be Al, Ti, V, Cr, Mn, Fe, Co, Li, Cu, Zn, Mg, Ga or Zr. Of course, Ni sites may be substituted by two or more types of other elements. The substituting element may be preferably Al, Cr, Fe, Co, Li, Mg, Ga or Mn, more preferably Al or Co. By such substitution of a part of Ni elements by Co or Al, the effect of improving the cycle characteristics and the safety will increase.

When the substituting element substitutes the Ni sites, its proportion is usually at least 2.5 mol %, preferably at least 5 mol %, against Ni element, and usually at most 50 mol %, preferably at most 30 mol %, against Ni element. If the proportion of the substitution is too small, the effect on improving e.g. the cycle characteristics may not be sufficient, and if it is too large, the capacity may decrease when a cell is constituted.

Further, a part of Li may be substituted by an element such as Al.

In the above-mentioned composition, there may be a small amount of oxygen deficiency or indefiniteness. Further, a part of oxygen sites may be substituted by sulfur or a halogen element.

The lithium-nickel compound oxide is particularly preferably a compound wherein Ni sites are unsubstituted or substituted by Co and Al, which is represented by the following formula (2):

$$Li_\alpha Ni_X Co_Y Al_Z O_2 \qquad (2)$$

In the formula (2), $\alpha$ is a number which changes according to the state of charging or discharging in the cell, and is a number usually in the range of $0 \leq \alpha \leq 1.1$, preferably in the range of $0.2 \leq \alpha \leq 1.1$. Further, X is a number usually in the range of $0.5 \leq X \leq 1$, preferably in the range of $0.7 \leq X \leq 0.9$. Y is a number usually in the range of $0 \leq Y \leq 0.5$, preferably in the range of $0.1 \leq Y \leq 0.3$. If it is larger than this range, the capacity decreases, and if it is smaller than this range, the effect becomes insufficient. Z is a number usually in the range of $0 \leq Z \leq 0.1$, preferably in the range of $0 \leq Z \leq 0.05$. If it is larger than this range, the capacity decreases, and if it is smaller than this range, the effect becomes insufficient. The above-mentioned X, Y and Z satisfy a relation of X+Y+Z=1.0. However, it may be a value slightly (particularly about ±0.1) deviating from 1.0 due to the presence of e.g. a crystal (lattice) defect in the material. In the present invention, by the substitution of a part of Ni elements by Co, the effect of improving the cycle characteristics and the safety will be increased as described above, and further, by the substitution of a part of Ni elements by Al, the improvement of the cycle characteristics and the safety will be further achieved.

The specific surface area of the lithium-nickel compound oxide used in the present invention, is usually at least 0.01 m$^2$/g, preferably at least 0.1 m$^2$/g, more preferably at least 0.5 m$^2$/g, and usually at most 10 m$^2$/g, preferably at most 5 m$^2$/g more preferably at most 2 m$^2$/g. If the specific surface area is too small, the rate characteristics and/or the capacity tends to be low, and if it is too large, an undesirable reaction with e.g. the electrolytic solution may be induced and the cycle characteristics may be lowered. The measurement of the specific surface area is according to BET method.

The average particle diameter of the lithium-nickel compound oxide used in the present invention is usually at least 0.1 µm, preferably at least 0.2 µm, more preferably at least 0.3 µm, most preferably at least 0.5 µm, and usually at most 300 µm, preferably at most 100 µm, more preferably at most 50 µm, most preferably at most 20 µm. If the average particle diameter is too small, the cell's cycle deterioration may become large or a safety problem may occur, and if it is too large, the internal resistance of the cell becomes large and it tends to be difficult to obtain a sufficient output.

In the present invention, the lithium-cobalt compound oxide and the lithium-nickel compound oxide may be mixed to obtain a positive electrode active material. By using both compound oxides, it is possible to make use of the advantages of both materials, and thereby to obtain a well balanced lithium secondary cell having a high initial efficiency, having a high energy density, having an inclination of the discharge curve inhibited to a certain extent, and being excellent in the output characteristics at low temperature.

The weight ratio between the lithium-nickel compound oxide and the lithium-cobalt compound oxide is not particularly restricted, and the ratio of the lithium-nickel compound oxide based on the total weight of the lithium-nickel compound oxide and the lithium-cobalt compound oxide, is usually from 1 to 99 wt %, preferably from 40 to 90 wt %. By adjusting the ratio in the above-mentioned range, the advantages of both materials may be made use of, and may be combined with the improvement of the impregnation property of the electrolyte achieved by incorporation of the compound represented by the formula (1) in the lithium secondary cell, to distinctly show the effect of the present invention.

As the negative electrode current collector, various metals such as copper, nickel and SUS may be used, but preferred is copper. The thickness of the current collector is usually at least 1 µm, preferably at least 3 µm, more preferably at least 5 µm, and, usually at most 30 µm, preferably at most 25 µm, more preferably at most 20 µm. From the viewpoint of the volume energy density and the weight energy density, the thinner the thickness of the current collector, the better. However, if it is too thin, there may be a case such that the handling becomes difficult in terms of e.g. strength at the time of producing a lithium secondary cell. The current collector may usually be one having a sheet shape such as a metal foil or one having a mesh shape such as a punching metal. The surface of the current collector may be subjected to a surface roughening treatment in advance as the case requires.

As an active material useful for the negative electrode, besides metal lithium, various compounds capable of absorbing and desorbing lithium, may be used. Specifically, metal lithium; a lithium alloy such as a lithium-aluminum alloy, a lithium-bismuth-cadmium alloy or a lithium-tin-cadmium alloy; or a carbon material such as graphite or coke, may, for example, be mentioned. Further, an oxide of e.g. silicon, tin, zinc, manganese, iron or nickel, or lead sulfate, may be used. If the metal lithium or the lithium alloy is used, a dendrite tends to be formed at the time of charging, and accordingly the safety tends to decrease, especially at the time of overcharging. Therefore, a carbon material such as graphite or coke is preferred. Such a carbon material is generally considered to have a high hydrophobic property, and accordingly exhibits a particularly remarkable effect for permitting the compound represented by the above-mentioned formula (1) generally having a high hydrophobic property, to be present. The particle diameter of the negative electrode active material may be usually from 1 to 50 µm, preferably from 15 to 30 µm, from the viewpoint of the cell characteristics such as the initial characteristics, the rate characteristics or the cycle characteristics.

The active material layers of the positive and negative electrodes usually contain a binder besides the above-mentioned active materials. The binder to be used needs to be stable against e.g. the electrolytic solution, and is desired to have weatherability, chemical resistance, heat resistance, flame resistance, etc. As the binder, an inorganic compound such as a silicate or glass, or various resins made mainly of polymers, may be used. As the resins, for example, an alkane type polymer such as polyethylene, polypropylene or poly-1,1-dimethylethylene; an unsaturated type polymer such as polybutadiene or polyisoprene; a polymer having a ring such as polystyrene, polymethylstyrene, polyvinyl pyridine or poly-N-vinyl pyrrolidone; an acryl derivative type polymer such as polymethyl methacrylate, polyethyl methacrylate, polybutyl methacrylate, polymethyl acrylate, polyethyl acrylate, polyacrylic acid, polymethacrylic acid or polyacrylamide; a fluorine type resin such as polyvinyl fluoride, polyvinylidene fluoride or polytetrafluoroethylene; a CN group-containing polymer such as polyacrylonitrile or polyvinylidene cyanide; a polyvinyl alcohol type polymer such as polyvinyl acetate or polyvinyl alcohol; a halogen-containing polymer such as polyvinyl chloride or polyvinylidene chloride; and a conductive polymer such as polyaniline, may be used. Further, e.g. mixtures, modified products, derivatives, random copolymers, alternate copolymers, graft-copolymers or block copolymers of the above-mentioned polymers, may also be used. The molecular weights of these resins are preferably at least 10,000, more preferably at least 20,000, and preferably at most 3,000,000, more preferably at most 1,000,000. By adjusting it in the above-mentioned range, sufficient strength of the active material layer can be secured.

The amount of incorporation of the binder is preferably from 0.1 to 30 parts, more preferably from 1 to 20 parts, based on 100 parts of the active material. If the amount of the binder is too small, the strength of the electrode may decrease, and if it is too large, the ionic conductivity tends to be low.

In the active material layer, a powder or a filler to provide various functions, such as a conductive material or a reinforcing material, may be contained as the case requires. As the conductive material, there is no particular restriction so long as it can impart electrical conductivity when mixed to the above-mentioned active material in an appropriate amount, and it may usually be a carbon powder such as acetylene black, carbon black or graphite, or a fiber or foil of various metals. When a carbon powder is used as the conductive material, its DBP oil absorption is preferably at least 120 cc/100 g, particularly preferably at least 150 cc/100 g, for holding the electrolytic solution. Further, as the reinforcing material, various inorganic or organic spherical or fibrous fillers, etc. may be used.

The electrode can be produced by coating the current collector with a coating material containing materials for constituting the active material layer, followed by drying. Thereafter, the active material layer may further be subjected to compaction treatment. By controlling e.g. the composition of the coating material, the drying condition or the compaction condition, it is possible to control the volume percentage of the binder in the active material layer or the porosity of the active material layer.

In order to improve the adhesion between the active material layer and the current collector, an undercoat primer layer may be provided therebetween, as the case requires.

When the undercoat primer layer is used, its composition may, for example, be a resin having conductive particles of e.g. carbon black, graphite or metal powder, incorporated or an organic conjugate type resin having electrical conductivity. It is preferred to use, as the conductive particles, carbon black or graphite, which can also work as an active material. Further, it is preferred to use, as the resin, polyaniline, polypyrrole, polyacene, a disulfide type compound, or a polysulfide type compound, which can work also as an active material, since it is thereby possible to prevent reduction of the capacity of the lithium secondary cell. In the case of a composition containing a resin having the conductive particles incorporated, as the main component, the proportion of the resin based on the conductive particles is preferably from 1 to 300 wt %. When it is at least 1%, the strength of the coating film is secured, and it is possible to effectively prevent occurrence of e.g. peeling in the use or in the production process of the lithium secondary cell. On the other hand, when it is at most 300 wt %, the conductivity is sufficiently secured, and it is possible to prevent deterioration of the cell characteristics. It is particularly preferably in the range of from 5 to 100 wt %. The film thickness of the undercoat primer layer is usually from 0.05 to 10 1 $\mu$m, preferably from 0.1 to 1 $\mu$m. When it is at least 0.05 $\mu$m, it is easy to secure the uniformity of the film thickness. On the other hand, when it is at most 1 $\mu$m, deterioration of the volume capacity of the cell can be prevented.

The electrolyte is present as a component constituting the electrolyte layer between the positive electrode and the negative electrode. Further, the electrolyte is usually impregnated also in the active material layer of the electrodes in the form of an ionic mobile phase.

As the electrolyte, one in a various state, such as an electrolytic solution, a polymeric solid electrolyte, a gel electrolyte or an inorganic solid electrolyte, may, for example, be used.

Among these electrolytes, a non-fluid electrolyte such as a polymeric solid electrolyte, a gel electrolyte or an inorganic solid electrolyte, tends to be inferior in the ionic conductivity or the affinity with an active material as compared with a liquid electrolyte consisting solely of an electrolytic solution, and consequently, the cell characteristics such as the cycle characteristics tend to be inferior. Therefore, when an electrolyte containing the non-fluid electrolyte is used, the improvement of the characteristics obtained by incorporating the compound described in the above-mentioned formula (1) becomes particularly significant. Further, the lithium secondary cell having such a non-fluid electrolyte, is produced usually via a step of impregnating e.g. electrodes with a solution containing an electrolytic solution, a monomer and a polymerization initiator, or with a solution containing an electrolytic solution and a polymer. However, the above-mentioned solution can hardly be impregnated into the electrodes, as it has high viscosity as compared with the electrolytic solution alone.

As a result, the impregnation property of the non-fluid electrolyte between the electrodes or into the electrodes is inferior as compared with the case where the electrolytic solution is used alone. Thus, the improvement of the impregnation property obtained by incorporating the compound of the above-mentioned formula (1) becomes particularly significant when the non-fluid electrolyte is used.

On the other hand, by using the non-fluid electrolyte, it becomes possible to effectively prevent leakage of the electrolyte out of the casing. Particularly, in the present invention, as the casing, one having a valuable shape is employed. Accordingly, the mechanical strength of the casing tends to be insufficient, and there may be a case where the casing is ruptured by e.g. a shock from outside. When such a rupture of the casing occurs, the electrolyte leaks out of the casing. However, since the non-fluid electrolyte is in a state of solid or gel, the leakage of the electrolyte is eased. And, accordingly, the safety of the lithium secondary cell is improved.

Therefore, by employing a casing having a variable shape, by using a non-fluid electrolyte as the electrolyte, and by incorporating the compound of the above-mentioned formula (1) to the lithium secondary cell, it is possible not only to significantly improve the safety of the lithium secondary cell, but also to improve the cycle characteristics and the impregnation property of the non-fluid electrolyte, thereby to improve the initial efficiency or the rate characteristics significantly.

On the other hand, an electrolytic solution having a lithium salt dissolved in a non-aqueous solvent, has high fluidity and usually tends to be superior in ionic conductivity to an non-fluid electrolyte. Therefore, it is preferred to let the electrolyte contain an electrolytic solution with a view to improving the impregnation property of the electrolyte.

Further, in the case of using a non-fluid electrolyte, the ionic conductivity is improved by impregnating the non-fluid electrolyte with an electrolytic solution. Also from such a viewpoint, it is preferred to let the electrolyte contain an electrolytic solution.

The electrolytic solution used as an electrolyte usually has a lithium salt as a supporting electrolyte, dissolved in a non-aqueous solvent. As the non-aqueous solvent, a solvent having a relatively high dielectric constant is preferably used. Specifically, a cyclic carbonate such as ethylene carbonate or propylene carbonate, a non-cyclic carbonate such as dimethyl carbonate, diethyl carbonate or ethylmethyl carbonate, an ether such as tetrahydrofuran, 2-ethyltetrahydrofuran or dimethoxyethane, a lactone such as γ-butyllactone, a sulfur compound such as sulfolane or a nitrile such as acetonitrile, may, for example, be mentioned. A cyclic carbonate and/or lactone is preferred from the viewpoint of the cell characteristics such as the cycle characteristics, the rate characteristics and the safety.

In the present invention, it is preferred to use, as a solvent for the electrolytic solution, a non-aqueous solvent having a boiling point of at least 150° C. under the atmospheric pressure (hereinafter it may sometimes be referred to as a high boiling point solvent). Here, "a boiling point of at least X° C." means that the vapor pressure does not exceed 1 atm even when heated from the room temperature to X° C. under a pressure of 1 atm. Namely, it is preferred to use a non-aqueous solvent which always has a vapor pressure of at most 1 atm when it is heated from room temperature to 150° C. under a pressure of 1 atm. As a result, it is possible not only to obtain higher cycle characteristics, but also to improve the safety of the cell. For example, a low boiling point solvent composed of such a solvent as dimethylcarbonate, diethylcarbonate or dimethoxyethane, is likely to be evaporated, and when only such a low boiling point solvent is used, bubbles due to evaporation of the solvent will be generated between the active material and the solvent, whereby the impregnation state of the electrolytic solution will be low, the interface tends to be non-uniform, and the cycle characteristics are likely to deteriorate.

By using a high boiling point solvent, even if the cell element is accommodated in the variable shape casing, it is possible to suppress a change of the shape (deformation) of the cell e.g. at high temperature, or evaporation or leakage of the electrolytic solution and the like. Such a high boiling point solvent may, for example, be propylene carbonate, ethylene carbonate, butylene carbonate, γ-butyrolactone or sulfolane.

Further, when the compound represented by the formula (1) is incorporated in the electrolytic solution, the compound can function also as a solvent of the electrolytic solution, and it is preferred that the solvent of the electrolytic solution comprises a cyclic carbonate and/or lactone and the compound represented by the above-mentioned formula (1). It is more preferred to use, as the solvent, a high boiling point solvent comprising a cyclic carbonate and/or lactone and the compound represented by the above-mentioned formula (1).

Here, the non-aqueous solvent preferably has a viscosity of at least 1 mPa·s.

The lithium salt as a supporting electrolyte to be used in the electrolyte, may, for example, be $LiPF_6$, $LiAsF_6$, $LiSbF_6$, $LiBF_4$, $LiClO_4$, LiI, LiBr, LiCl, LiAlCl, $LiHF_2$, LiSCN or $LiSO_3CF_2$. Among these, $LiPF_6$ and $LiClO_4$ are particularly preferred. The content of such a supporting electrolyte in the electrolytic solution is usually from 0.5 to 2.5 mol/l.

By using the above-mentioned electrolytic solution and a polymer for forming a gel, a gel state non-fluid electrolyte (in the present specification, a gel state non-fluid electrolyte may sometimes be referred to simply as a gelled electrolyte.) can be constituted. The gelled electrolyte usually comprises the above-mentioned electrolytic solution and a polymer holding it. The gelled electrolyte can impart an ionic conductivity substantially equivalent to that of the electrolytic solution, and makes the electrolyte to be non-fluid. Therefore, a particularly preferred embodiment of the present invention is to employ an non-fluid electrolyte containing an electrolytic solution and a polymer.

The concentration of the polymer based on the electrolytic solution in the gelled electrolyte, may depend on the molecular weight of the polymer used, but is usually from 0.1 to 30 wt %. If the concentration is too low, it tends to be difficult to form a gel, and the capability to hold the electrolytic solution lowers, whereby a problem of flowage or leakage may occur. If the concentration is too high, not only the viscosity becomes so high that a difficulty in the production process occurs, but also the proportion of the electrolytic solution lowers, and the ionic conductivity lowers, whereby the cell characteristics such as the rate characteristics tend to lower accordingly. As the polymers for holding the electrolyte, various polymers having a function of gelling the electrolyte, such as a poly(meth)acrylate polymer, an alkylene oxide polymer having alkylene oxide units, or a fluoropolymer such as a polyvinylidene fluoride or a vinylidene fluoride-hexafluoropropylene copolymer, may be mentioned.

As a method of forming the gelled electrolyte, a material/method as the case requires, may be employed, such as a method of applying solidification treatment to an electrolyte precursor solution having a polymer preliminarily dissolved in an electrolytic solution, or a method of subjecting an electrolyte precursor solution having a polymerizable gelling agent incorporated in an electrolytic solution to a cross-linking reaction to form an non-fluid electrolyte.

In the case of carrying out the forming of the gelled electrolyte by subjecting the coating material having a polymerizable gelling agent incorporated in an electrolytic solution to a cross-linking reaction, a monomer capable of forming a polymer when subjected to polymerizing treatment such as ultraviolet ray curing or thermosetting, is used as the polymerizable gelling agent. And, by incorporating this polymerizable gelling agent in the electrolytic solution, the coating material is prepared.

The polymerizable gelling agent may, for example, be one having an unsaturated double bond such as an acryloyl group, a methacryloyl group, a vinyl group or an allyl group. Specifically, for example, acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, methoxyethyl methacrylate, ethoxyethoxyethyl methacrylate, polyethylene glycol monomethacrylate, N,N-diethylaminoethyl acrylate, N,N-dimethylaminoethyl acrylate, glycidyl acrylate, allyl acrylate, acrylonitrile, N-vinyl pyrrolidone, diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate, polyalkylene glycol diacrylate, polyalkylene glycol dimethacrylate, trimethylol propane alkoxylate triacrylate, pentaerythritol alkoxylate triacrylate, pentaerythritol alkoxylate tetraacrylate or ditrimethylol propane alkoxylate tetraacrylate may, for example, be mentioned. A plurality of these may be used in combination. Among these, particularly preferred is a diacrylate or a triacrylate each containing a plurality of ethylene oxide groups. The content of the polymerizable gelling agent in the electrolytic solution is not particularly restricted, and preferably at least 1 wt %. If the content is low, the efficiency of forming the polymer lowers and it becomes difficult to solidify the electrolytic solution. On the other hand, if the content is too high, an unreacted polymerizable gelling agent remains and the handling efficiency as an electrolyte precursor solution deteriorates. Therefore, it is usually at most 30 wt %.

In the case of forming the gelled electrolyte by the method of solidifying the electrolyte precursor solution having a polymer incorporated in advance, it is preferred to use, as the polymer, a polymer soluble in the electrolytic solution at high temperature and capable of forming a gelled electrolyte at room temperature. Namely, the gelled electrolyte is obtained by bringing the polymer dissolved in the electrolytic solution at high temperature, to the room temperature. Such a high temperature is usually from 50 to 200° C., preferably from 100 to 160° C. If the polymer is dissolved at too low temperature, the stability of the gelled electrolyte lowers. If the dissolution temperature is too high, decomposition of e.g. the electrolytic solution component or the polymer may be induced. As a method of solidifying, it is preferred to leave the electrolytic solution at room temperature. However, forced cooling may also be used. As a useful polymer, for example, a polymer having a ring such as polyvinyl pyridine or poly-N-vinyl pyrrolidone; an acryl derivative polymer such as polymethyl methacrylate, polyethyl methacrylate, polybutyl methacrylate, polymethyl acrylate, polyethyl acrylate, polyacrylic acid, polymethacrylic acid or polyacrylamide; a fluoro-resin such as polyvinyl fluoride or polyvinylidene fluoride; a CN group-containing polymer such as polyacrylonitrile or polyvinylidene cyanide; a polyvinyl alcohol polymer such as polyvinyl acetate or polyvinyl alcohol; a halogen-containing polymer such as polyvinyl chloride or polyvinylidene chloride, may be mentioned. Among these, it is preferred to use polymethyl methacrylate, polyacrylonitrile, polyethylene oxide or a modified product thereof. Mixtures, converted materials, derivatives, random copolymers, alternate copolymers, graft-copolymers, block copolymers, etc. of the above-mentioned polymers, may also be used.

The weight average molecular weight of such a polymer is preferably in the range of from 10,000 to 5,000,000. If the molecular weight is low, the gel tends to hardly form. On the other hand, if the molecular weight is too high, the viscosity becomes too high and the handling in the process of producing the lithium secondary cell becomes difficult.

Among these methods to form the gelled electrolyte, the method of subjecting the electrolyte precursor solution having a polymerizable gelling agent incorporated in the electrolytic solution to a cross-linking reaction to form a non-fluid electrolyte, is preferred, since it improves the closeness between the electrodes, whereby the effect of the present invention becomes especially remarkable.

In the electrolyte, various additives can be incorporated in order to improve the performance of the cell, as the case requires. As an additive for exhibiting such a function, there is no particular restriction, and for example, trifluoropropylene carbonate, 1,6-dioxaspiro[4,4]nonane-2,7-dione, 12-crown-4-ether, vinylene carbonate, catechol carbonate, succinic anhydride, dimethylsulfone, propane sultone, sulfolane or sulfolene may be mentioned.

In the present invention, it is preferred to incorporate a surface active agent to the electrolyte. By using the surface active agent and the compound of the above-mentioned formula (1), the impregnation property of the electrolyte further improves, and it becomes possible to obtain a lithium secondary cell having good initial efficiency and rate characteristics.

As the surface active agent, for example, an anionic surface active agent, a cationic surface active agent or a nonionic surface active agent, may be mentioned. Among these surface active agents, it is preferred to use a nonionic surface active agent. The nonionic surface active agent has little tendency to inhibit ionic movement or oxidation-reduction reaction in the lithium secondary cell, whereby good cell characteristics can be maintained even if it is contained in the electrolyte.

The nonionic surface active agent has a hydrophobic group and a polar group. As the hydrophobic group, for example, an aromatic group, an alkyl group, an alkyl group substituted by fluorine or an aromatic group substituted by alkyl, may be mentioned. Among these hydrophobic groups, a fluoroalkyl group is preferred. On the other hand, as the polar group, for example, an ether group such as ethylene oxide, or an ester group such as phosphoric ester, may be mentioned. Among these polar groups, an ethylene oxide group is preferred.

As a surface active agent to be used in the present invention, a fluorine-type surface active agent is preferred. More particularly, for example, a perfluoroalkyl sulfonic imide ethyleneoxide adduct may be mentioned.

The electrolyte layer usually comprises a spacer made of a porous sheet impregnated with the electrolyte. The spacer is a porous film provided between the positive electrode and the negative electrode, which insulates these and supports the electrolyte layer. The material for the spacer may, for example, be a polyolefin such as polyethylene or polypropylene, a polyolefin wherein a part or all of the hydrogen atoms are substituted by fluorine atoms, or a polymer such as polyacrylonitrile or polyaramid. A polyolefin or a fluorine-substituted polyolefin is preferred. Specifically, polyethylene, polypropylene, polytetrafluoroethylene or polyvinylidene fluoride may, for example, be mentioned. Of course, it may be a copolymer containing monomer units of the above-mentioned polymer, or a mixture of such polymers. The spacer may be a stretched film formed by uniaxial or biaxial stretching, or may be a nonwoven fabric. The film thickness of the spacer is usually at most 100 μm, preferably at most 50 μm, more preferably at most 30 μm, most preferably at most 20 μm. If the film thickness is too much, the rate characteristics or the volume energy density of the cell tends to be low. Further, when it is too thin, cutting tends to be difficult because of insufficient rigidity, and short circuiting is likely to occur. Therefore, the film thickness is usually at least 5 μm, preferably at least 7 μm, more preferably at least 8 μm. The porosity of the spacer is usually from 45 to 90%, preferably from 45 to 75%. If the porosity is too large, the mechanical strength will be insufficient, and if it is too small, e.g. the rate characteristics of the cell tend to be low.

The cell element having the positive electrode, the negative electrode and the electrolyte, is sealed in a casing having a variable shape. The cell element may have a rolled shape formed by winding a laminate comprising the positive electrode, the negative electrode and the electrolyte layer, and can be sealed in the casing. Otherwise, the laminate can also be sealed in the casing as its flat plate-shape. Multiple cell elements can be accommodated in a casing. In the case of accommodating multiple cell elements, these cell elements can be connected in parallel or in series.

Now, specific embodiments of the lithium secondary cell of the present invention will be explained with reference to lithium secondary cells wherein a cell element having a plurality of flat plate-shaped unit cell elements stacked in the direction of the thickness, is sealed in a casing made of a film-shaped sheathing member. However, these are presented merely as exemplary, and the present invention is by no means restricted to such embodiments.

Figure 2:
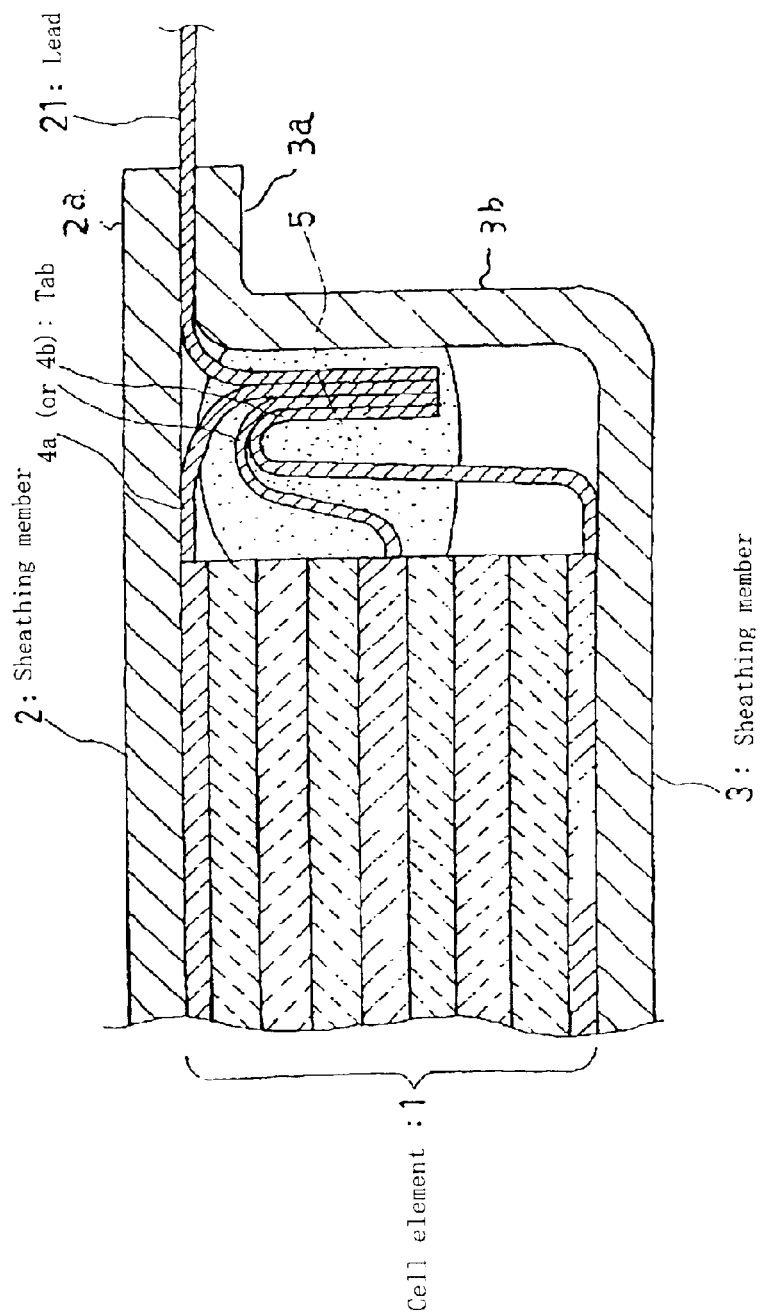
FIG. 2: A cross-sectional view of the essential part of the cell according to the embodiment.
Figure 3:
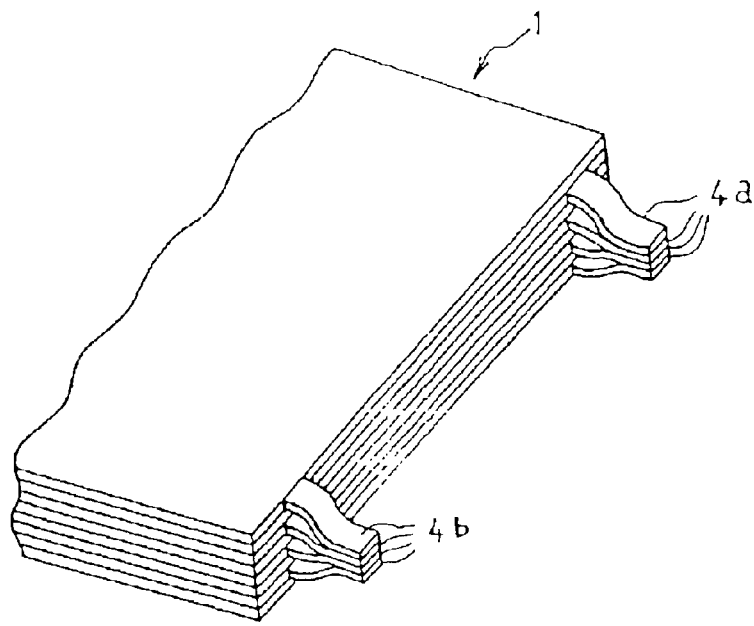
FIG. 3: A perspective view illustrating the cell element of the cell according to the embodiment.
Figure 4:
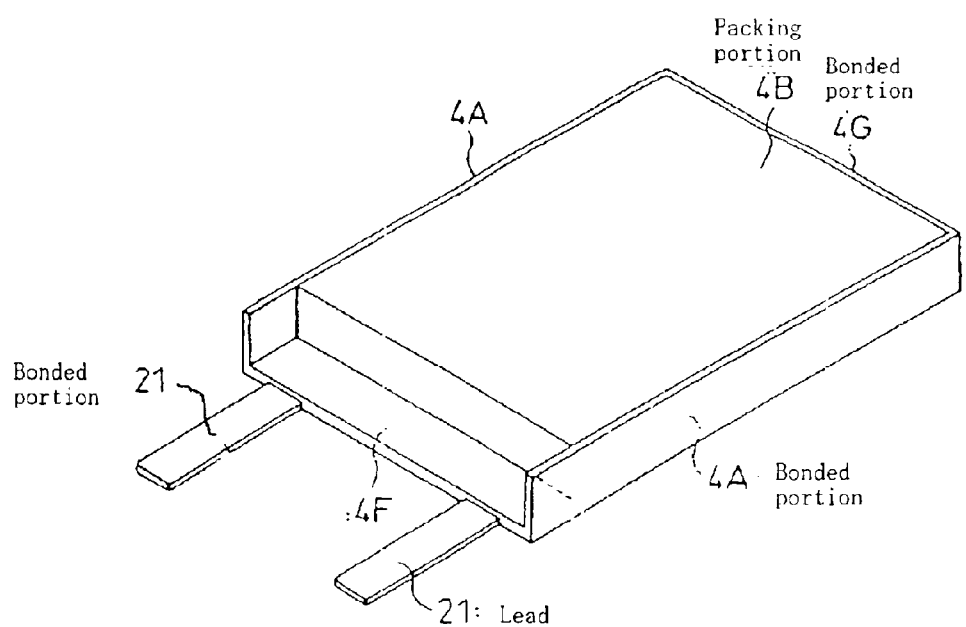
FIG. 4: A perspective view of the cell according to the embodiment.

FIG. 1 is an exploded perspective view of the cell of the present embodiment, FIG. 2 is a cross-sectional view of the essential part of the cell, FIG. 3 is a schematic perspective view of the cell element, and FIG. 4 is a perspective view of the cell.

This cell is one prepared in such a manner that a cell element 1 is accommodated in a recess of a sheathing member 3, then an insulating material 5 such as an epoxy resin or an acrylic resin is injected in the vicinity of terminal portions (tabs 4a and 4b) of the cell element 1, then the sheathing member 3 is covered with a sheathing member 2, followed by vacuum sealing to bond peripheral portions 2a and 3a of the sheathing members 2 and 3.

As illustrated in FIG. 1, the sheathing member 2 has a flat plate-shape. The sheathing member 3 is a shallow uncovered box-like member having a receiving portion 3b being a square box form recess, and the peripheral portion 3a flanged outwardly from the four peripheries of this receiving portion 3b.

As illustrated in FIG. 3, the cell element 1 comprises a plurality of unit cell elements stacked in the direction of the thickness. From the unit cell elements, the tabs 4a or 4b are led out. Tabs 4a from the respective positive electrodes are bundled one another, (namely, stacked one another), and a positive electrode lead 21 is bonded thereto to form a positive electrode terminal. Tabs 4b from the respective negative electrodes are also bundled, and a negative electrode lead 21 is bonded thereto to form a negative electrode terminal.

The cell element 1 is accommodated in the receiving portion 3b of the sheathing member 3, the insulating material 5 is injected to the vicinity of tabs 4a and 4b, and the side surface of the cell element in the vicinity of the positive electrode terminal and the negative electrode terminal is covered with the insulating material. Then, the sheathing member 2 is put thereon. A pair of leads 21 extending from the cell element 1, are led out to the outside through the mating face of the peripheral portions 2a and 3a on one side of the respective sheathing members 2 and 3. Then, the peripheral portions 2a and 3a of four peripheries of the sheathing members 2 and 3 are bonded to each other for sealing by a method such as thermocompression bonding or ultrasonic welding in a reduced pressure (preferably vacuum) atmosphere, whereby the cell element 1 is sealed in the sheathing members 2 and 3. Then, the insulating material 5 is subjected to curing treatment by e.g. heating, whereby the insulating material 5 is completely fixed in the vicinity of the terminals. Since the sheathing members are sealed before the insulating material is completely fixed, the shape of the cell is not likely to change at the time of the fixing. By filling the insulating material 5 in the vicinity of the terminal portions (tabs 4a and 4b), swelling of the cell element in the initial stage of overcharging can effectively be prevented, and further, short circuiting is effectively prevented.

By the bonding of the peripheral portions 2a and 3a to each other, bonded portions 4A, 4F and 4G are formed. These bonded portions 4A, 4F and 4G flange outwardly from a packing portion 4B packing the cell element 1. Then, these bonded portions 4A, 4F and 4G are folded along the packing portion 4B (see FIG. 4).

Further, it is preferred to employ a method of fastening (fixing) these bonded portions to the side surface of the packing portion 4B by means of e.g. an adhesive or an adhesive tape. In the cell thus constituted, swelling of the cell element in the initial stage of overcharging can effectively be prevented, and the strength and rigidity of the side surface of the cell can be improved. Of course, separation of the folded bonded portions from the packing portion can also be prevented. Further, since the strength and rigidity of the side surface of the cell are high, separation of the active material from the current collectors is prevented, even when the side surface receives a shock.

As the above-mentioned insulating material 5, a synthetic resin is preferred, and an epoxy resin, an acryl resin or a silicone resin may, for example, be mentioned. Among them, an epoxy resin or an acryl resin is preferred, since the curing time is short. Particularly, an acryl resin is most preferred, since it has a low possibility of giving an adverse affect to the cell performance. The insulating material is supplied to the vicinity of the terminal portions in an uncured state having fluidity, and will be fixed completely in the vicinity of the terminals by curing.

In FIG. 1, the insulating material is supplied independently to the positive electrode terminal portion and to the negative electrode terminal portion. However, in order to increase the safety at the time of overcharging, the entire side surface of the cell element ranging from the positive electrode terminal portion to the negative electrode terminal portion, may be covered.

Figure 5:
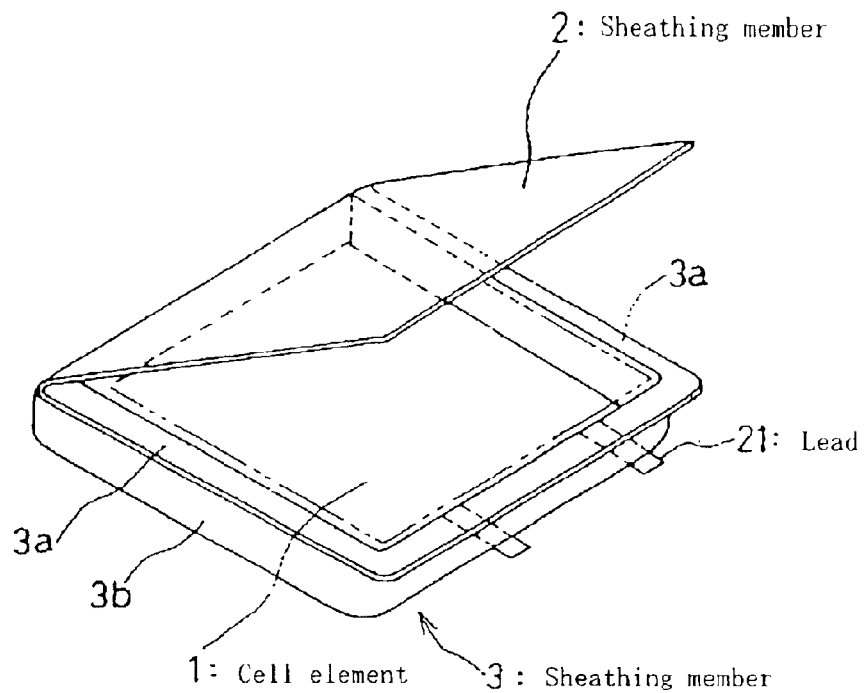
FIG. 5: A perspective view of a cell according to another embodiment in the process of its production.

In FIG. 1, the sheathing members 2 and 3 are separated members. However, in the present invention, the sheathing members 2 and 3 may be continuously unified as shown in FIG. 5. In FIG. 5, one side of the sheathing member 3 and one side of the sheathing member 2 are joined, whereby the sheathing member 2 forms a shape of cover plate foldable against the sheathing member 3. The recess of the receiving portion 3b is formed starting from one side where the sheathing members 2 and 3 are joined, and on this one side, the construction is the same as the bonded portions except that no bonded portion is formed.

Also in the case of FIG. 5, the insulating material is injected in the vicinity of tabs 4a and 4b of the cell element 1 after accommodating the cell element 1 in the receiving portion 3b.

Figure 6:
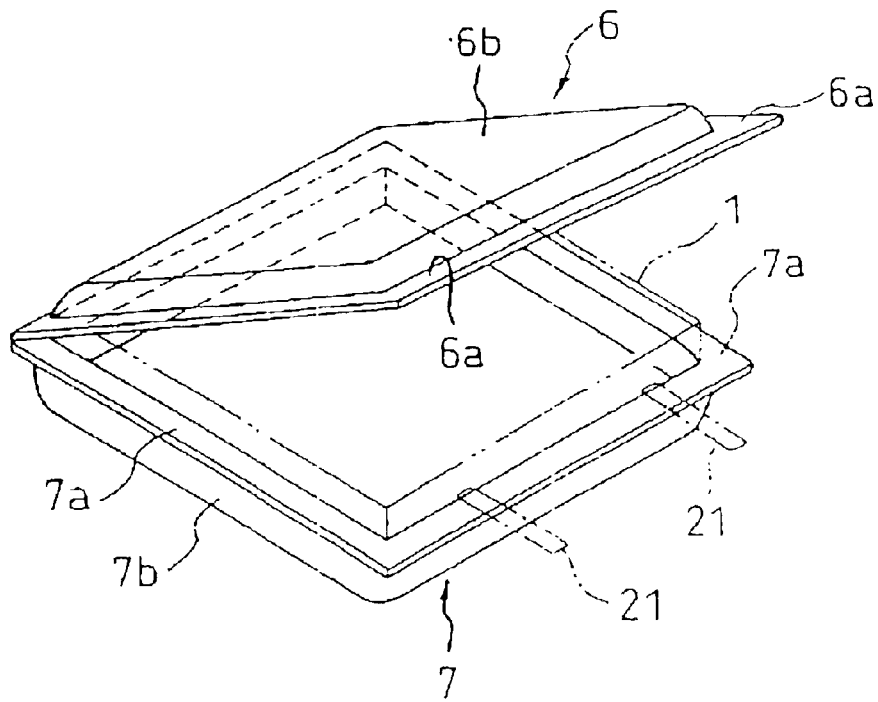
FIG. 6: A perspective view of a cell according to still another embodiment in the process of its production.

In FIGS. 1 and 5, the sheathing member 3 having the receiving portion 3b, and the sheathing member 2 being a flat plate are illustrated. However, in the present invention, as shown in FIG. 6, the cell element 1 may be packed by sheathing members 6 and 7, having shallow box-form receiving portions 6b and 7b, respectively, and having peripheral portions 6a and 7a flanged outwardly from the receiving portions 6b and 7b, respectively. In FIG. 6, the sheathing members 6 and 7 are continuously unified. However, these may be separated in the same manner as in FIG. 1.

In the constructions in FIGS. 1, 5 and 6, the receiving portion for the cell element is preformed, and the cell element can be accommodated compactly, and the accommodation itself is easy.

In the above-mentioned description, the insulating material is injected to the vicinity of the terminals after the cell element has been accommodated in the receiving portion. However in this method, the insulating material is likely to deposit on or flow to the mating face of the peripheral portions or between the cell element and the sheathing material, whereby the bonding of the peripheral portions will be impaired, or the cell shape will not be as designed. Then, by accommodating the cell element in the receiving portion after supplying the insulating material to the vicinity of the terminals of the cell element, the above-mentioned problems can be prevented. Particularly, in the case of FIG. 6, the insulating material cannot be supplied to about the upper half of the cell element even if the insulating material is supplied after accommodation of the cell element, and it is preferred to use the above-mentioned production method wherein the insulating material is supplied to the vicinity of the terminals of the cell element in advance before the cell element is accommodated in the receiving portion. On the other hand, in this method, it is necessary to transport the cell element which is not easy to handle in such a state that the insulating material has been supplied, and to place it in the sheathing members, and accordingly, a due care is required in its handling in the production. In this respect, the first method may be preferred, wherein the insulating material is injected to the vicinity of the terminal portions of the cell element after the cell element is accommodated in the receiving portion.

Figure 7:
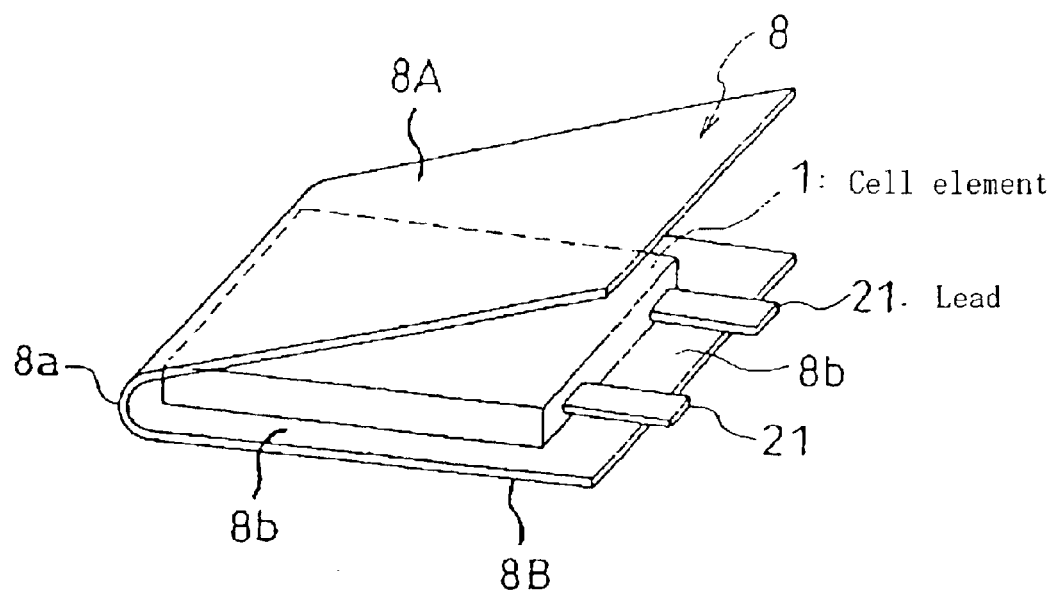
FIG. 7: A perspective view of a cell according to a further different embodiment in the process of its production.
Figure 8:
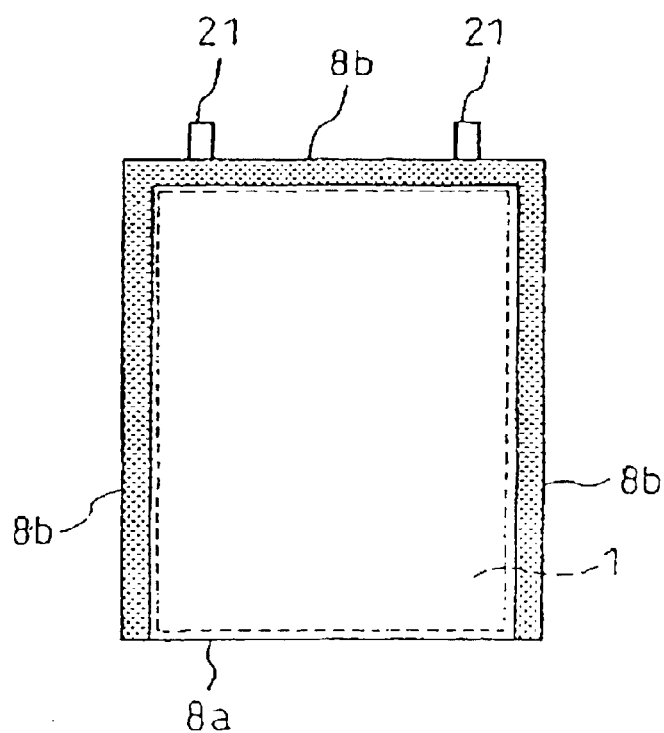
FIG. 8: A plan view of the embodiment of FIG. 7 in the process of its production.

In the present invention, as shown in FIG. 7, a flat sheet-shaped sheathing member 8 may be folded along the centerline 8a to form two members, i.e. a first member 8A and a second member 8B, then the cell element 1 may be interposed between the first member 8A and the second member 8B, and as shown in FIG. 8, peripheral portions 8b of the first and second members 8A and 8B may be bonded to each other to seal in the cell element 1. Further, a method may also be mentioned wherein both ends of a film shaped sheathing member is bonded to each other to form a tube, the cell element is accommodated in the tube, and then the top and the bottom portions of the tube are bonded.

Also in these cases, the first member 8A and the second member 8B of the sheathing member 8 are put together to seal in the cell element 1 before or after supplying the insulating material to the vicinity of tabs 4a and 4b of the cell element 1. Further, bonded portions are preferably folded along the packing portion and fixed thereto.

In the step of covering of the side surface of the cell element in the vicinity of the terminal portions, it is particularly preferred to provide between the positive and negative electrodes, spacers larger than these, and to bond the protruded portions of these spacers one another.

Figure 18:
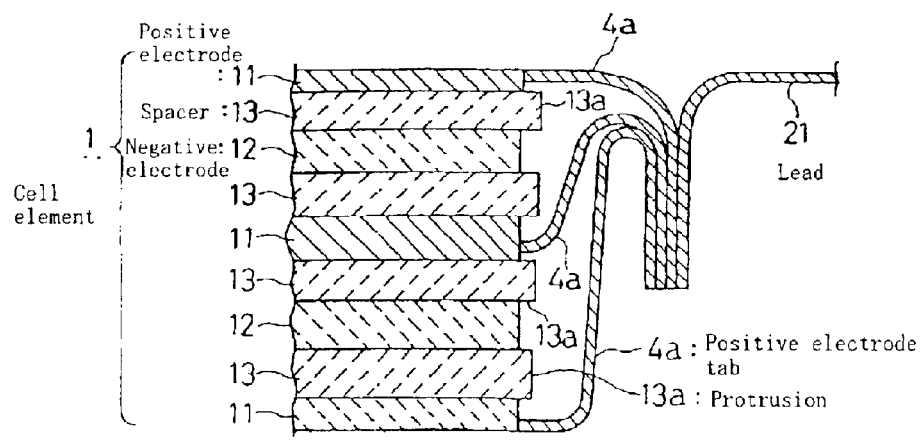
FIG. 18: An enlarged cross-sectional view of a tab portion of the cell element.

Namely, in the cell element, for example as shown in FIG. 18, the spacers 13 slightly protrude from the positive electrodes 11 and the negative electrodes 12 to form the protruded portions 13a, whereby short circuiting between the positive electrodes 11 and the negative electrodes 12 is prevented. By fixing the protruded portions 13a one another with the insulating material, the cell element is restricted in the direction of lamination, whereby swelling of the cell element is prevented even at the time of overcharging, and heat-induced overdrive of the cell can be prevented. Of course, the insulating material can be supplied over the entire side surface of the cell element, which is also preferred.

Figure 17:
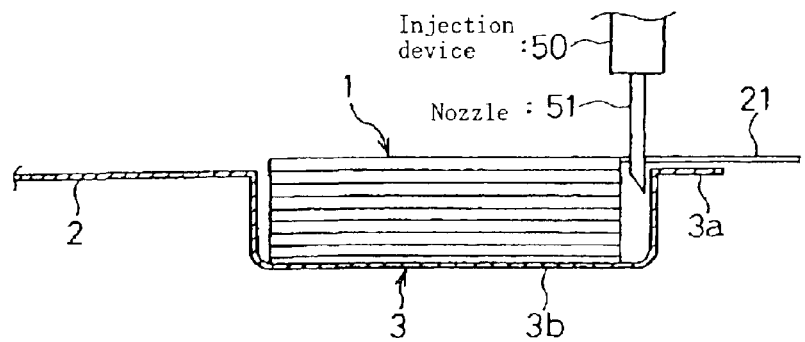
FIG. 17: A cross-sectional view illustrating the state of injecting an insulating material.

In order to inject the insulating material, as shown in FIG. 17, it is preferred to insert a nozzle 51 of an insulating material injecting device 50, inside the sheathing member 3, and to inject the insulating material on the side end surface of the cell element 1.

Figure 14:
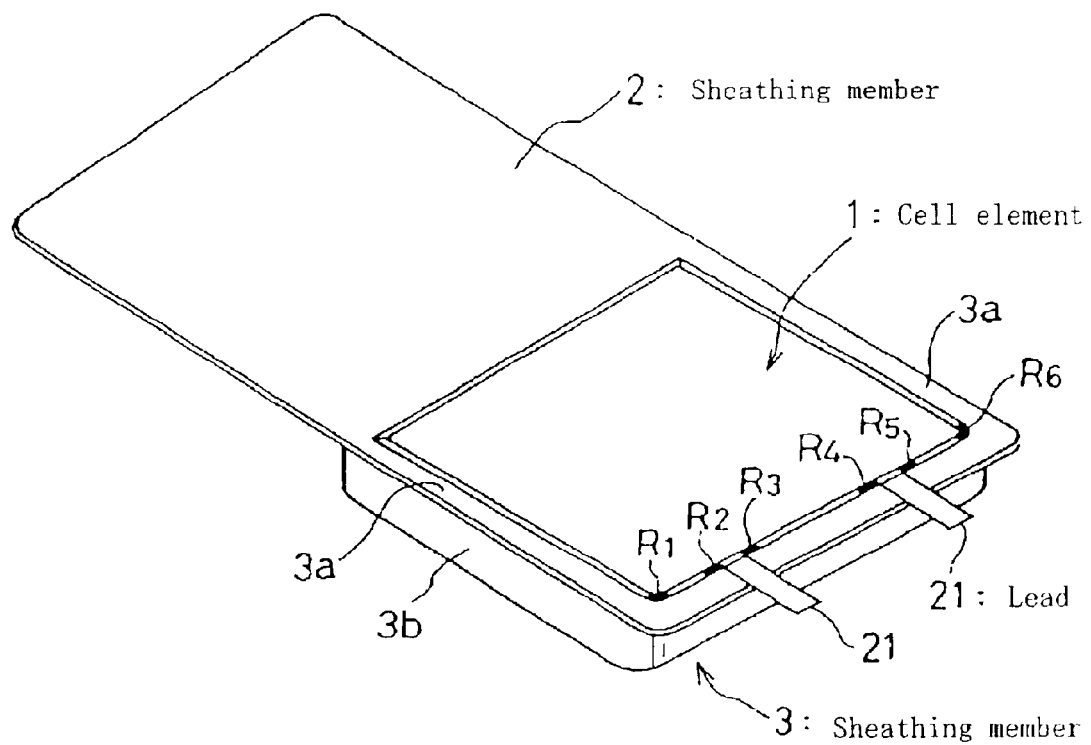
FIG. 14: A perspective view of a cell according to another embodiment in the process of its production.
Figure 15:
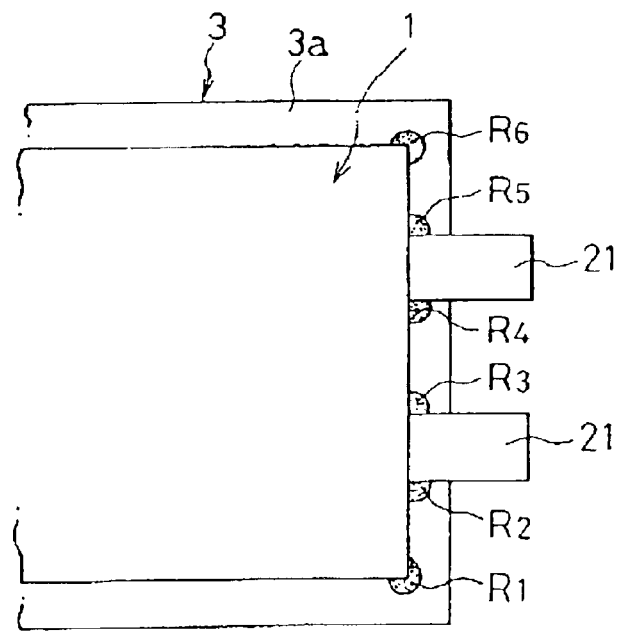
FIG. 15: A plan view schematically illustrating the state of FIG. 14.
Figure 16:
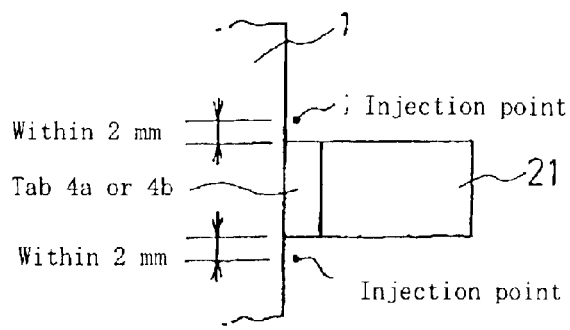
FIG. 16: An enlarged view of the essential part of FIG. 15.

In this case, as shown in FIGS. 14, 15 and 16, it is preferred to inject the insulating material at a plurality of portions such as both corner portions R1 and R6 of the side end surface having the tab 4a or 4b, as well as both sides R2, R3, R4 and R5 of the roots of the respective tabs 4a and 4b. The insulating material thus injected penetrates over the entire one side including the positive electrode terminal portion and the negative electrode terminal portion by an action of e.g. the capillary phenomenon. The injecting device 50 is provided with multiple (six) nozzles and can inject an insulating material to multiple portions at the same time.

Further, as shown in FIG. 16, when the insulating material is injected to both sides of the roots of tabs 4a and 4b, the injecting point (the center of injecting nozzle 51) is preferably within 2 mm from the tab 4a or 4b. When the insulating material is thus injected to both sides of the roots of the tabs 4a and 4b, not only the insulating material fixes the protruded portions 13a one another, but also in the same manner as in the case of FIG. 5, a construction can also be obtained wherein at least a part of the positive electrode terminal portion and the negative electrode terminal portion is covered with the insulating material 5.

In the above-mentioned construction, the bonded portions formed by bonding film-form sheathing members, are folded along the packing portion packing the cell element, and more preferably, they are folded from the root of the packing portion. In this case, the bonded portions may be folded at the root of the packing portion one time, or may be folded multiple times. When they are folded multiple times, it is preferred to fold the bonded portions so that the front edges of the bonded portions come between the bonded portions and the packing portion. Thus, the front edges of the bonded portions are insulated from the external air, and intrusion of e.g. moisture or air from the front edges can be prevented.

As the adhesive useful for fixing the bonding portions to the packing portion, an epoxy adhesive, an acryl adhesive, a urethane adhesive, a hot melt adhesive or a synthetic rubber adhesive may, for example, be mentioned. Among these, a hot melt adhesive having a short curing time and being curable even under the environment of a low dew point to be used at the time of producing a non-aqueous type cell, is preferred.

The cell element may be a flat plate stack type cell element which comprises a plurality of flat plate-shaped unit cell elements each having a positive electrode, a negative electrode and a spacer, stacked in the thickness direction. A preferred construction of the unit cell element will be explained below.

Figure 9:
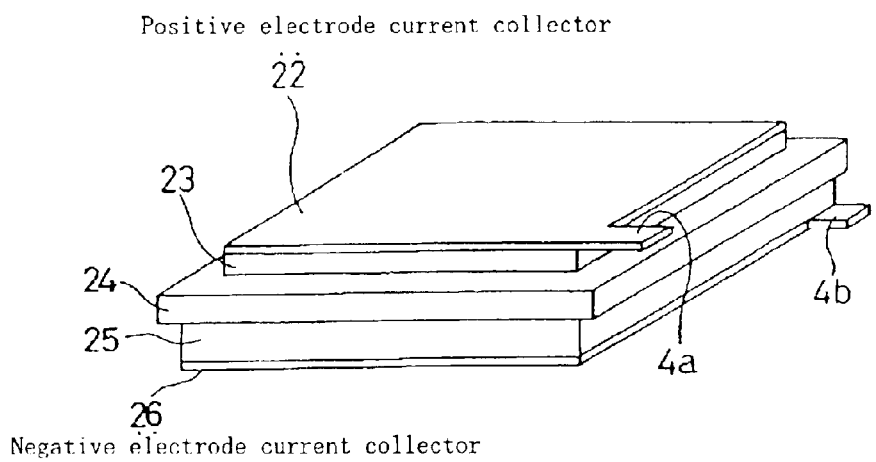
FIG. 9: A schematic cross-sectional view of a unit cell element.

FIG. 9 illustrates a preferred example of the unit cell element for the lithium secondary cell element. The unit cell element comprises a positive electrode comprising a positive electrode current collector 22 and a positive electrode active material layer 23, a spacer (electrolyte layer) 24, and a negative electrode comprising a negative electrode active material layer 25 and a negative electrode current collector 26, laminated one another. In order to suppress precipitation of lithium dendrite, the negative electrode is made larger than the positive electrode. Further, in order to prevent short circuiting, the spacer 24 is made larger than the positive electrode and the negative electrode. By making the spacer larger than the positive and negative electrodes, as mentioned above, it is possible to fix the protruded portions of the spacers of the respective unit cell elements one another.

The cell element is formed by stacking a plurality of such unit cell elements, and in this stacking step, a unit cell element in the regular position (FIG. 9) having the positive electrode on the top side and the negative electrode on the bottom side, and a unit cell element in the reversed position (figure is omitted) having reversely the positive electrode on the bottom side and the negative electrode on the top side, are laminated alternately. Namely, these are stacked so that in the unit cell elements adjacent in the stacked direction, the same electrodes (namely, positive electrode and positive electrode, or negative electrode and negative electrode) face each other.

In this unit cell element, the positive electrode current collector 22 is provided with the positive electrode tab 4a extending therefrom, and the negative electrode current collector 26 is provided with the negative electrode tab 4b extending therefrom.

Figure 10:
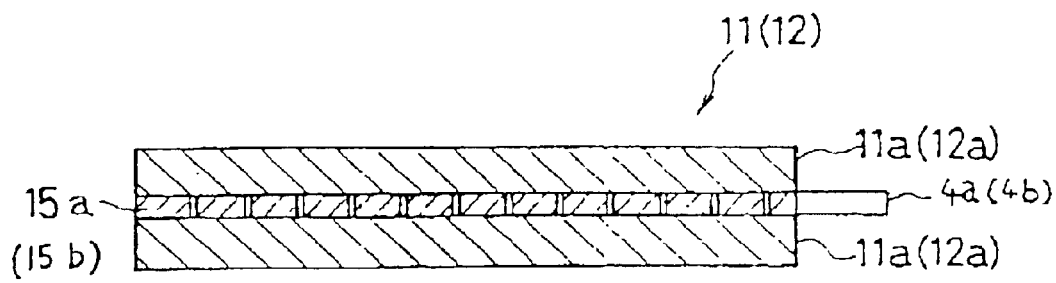
FIG. 10: A schematic cross-sectional view of a positive electrode or a negative electrode.
Figure 11:
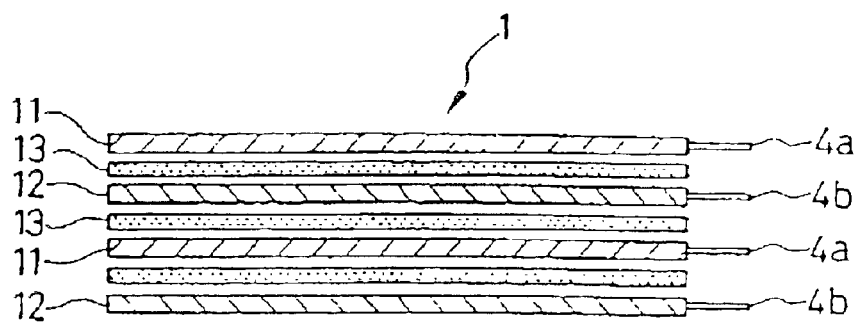
FIG. 11: A schematic cross-sectional view of a cell element.

Instead of the unit cell element which comprises a positive electrode active material layer, a spacer and a negative electrode active material layer laminated between a positive electrode current collector and a negative electrode current collector as illustrated in FIG. 9, the unit cell element may be such that, as illustrated in FIG. 10, on both sides of a positive electrode current collector 15a or a negative electrode current collector 15b as a core member, positive electrode active material layers 11a or negative electrode active material layers 12a are laminated to form a positive electrode 11 or a negative electrode 12, and then such a positive electrode 11 and such a negative electrode 12 are laminated alternately via a spacer (electrolyte layer) 13 as illustrated in FIG. 11 to form a unit cell element. In this case, the combination of a pair of the positive electrode 11 and the negative electrode 12 (strictly speaking, from the center in the direction of the thickness of the current collector 15a of the positive electrode 11, to the center of the direction of the thickness of the current collector 15b of the negative electrode 12) corresponds to a unit cell element.

The planar shape of the electrode is optional, and may be quadranglar, circular, polygonal or the like.

As illustrated in FIGS. 9 and 10, the current collectors 22 and 26, or 15a and 15b, are usually provided with tabs 4a and 4b for connection to leads. When the electrode is quadrangular, usually as illustrated in FIG. 3, the tab 4a protruding from the positive electrode current collector, is formed in the vicinity of one end of one side of the electrode, and, the tab 4b of the negative electrode current collector is formed in the vicinity of the other end.

Stacking a plurality of the unit cell elements is effective to increase the capacity of the cell, and in this method, the tabs 4a and the tabs 4b from the respective unit cell elements are usually respectively bonded in the direction of the thickness to form terminal portions of the positive electrode and the negative electrode. As a result, it becomes possible to obtain a cell element 1 having a large capacity.

To the tabs 4a and 4b, leads 21 made of a metal foil are bonded as illustrated in FIG. 2. As a result, the leads 21 and the positive electrode and the negative electrode of the cell are connected electrically. Bonding between the tabs 4a one another, tabs 4b one another, and between the tabs 4a and the lead 21, or the tabs 4b and the lead 21 can be performed by resistance welding such as spot welding, ultrasonic welding or laser welding.

For at least one, preferably both of the above-mentioned positive and negative electrode leads 21, an annealed metal is preferably used. As a result, a cell excellent not only in the strength but also in the durability against folding, can be obtained.

As a type of the metal to be used for the leads, aluminum, copper, nickel or SUS, may, usually, be used. A material preferred for the positive electrode lead is aluminum. A material preferred for the negative electrode lead is copper.

The thickness of a lead 21 is usually at least 1 $\mu$m, preferably at least 10 $\mu$m, more preferably at least 20 $\mu$m, most preferably at least 40 $\mu$m. If it is too thin, the mechanical strength such as the tensile strength tends to be insufficient. Further, the thickness of the lead is usually at most 1,000 $\mu$m, preferably at most 500 $\mu$m, more preferably at most 100 $\mu$m. If it is too thick, the durability against folding tends to deteriorate, and sealing of the cell element by the casing tends to be difficult. The advantage obtainable by using, for the lead, an annealed metal as described hereinafter, becomes more distinct as the thickness of the lead becomes thicker.

The width of the lead is usually at least 1 mm and at most 20 mm, particularly, at least 1 mm and at most about 10 mm, and the length of the lead exposed to the outside is usually at least 1 mm and at most about 50 mm.

The cell element to be used may be the above-mentioned flat plate lamination type cell which comprises the unit cell elements each having a flat plate-shape, laminated in the direction of the thickness, but it may, for example, be a rolled type cell which is formed by winding a laminate having a positive electrode and a negative electrode laminated via an electrolyte layer. In each of these cases, it is preferred that a spacer is interposed between the positive electrode and the negative electrode, and the spacer is made larger than the positive and negative electrodes to form a protrusion.

The casing for receiving the cell element has a variable shape. In the present invention, a sheathing member having a variable shape is employed as a casing, and here, "having a variable shape" means having a flexibility. By employing such a casing, cells having various shapes can be prepared. Further, such a casing is thin and light in weight, and the cell's volume energy density and weight energy density can thereby be improved.

As the material for the sheathing member, a metal foil such as an aluminum foil or a copper foil, or a sheet-form synthetic resin, may, for example, be employed. Preferred is a laminated film provided with a gas barrier layer and a resin layer, particularly, a laminated film having resin layers formed on both sides of a gas barrier layer. Such a laminated film not only has high gas barrier performance, but also has high shape-variability and thinness. As a result, reducing the thickness and weight of the sheathing material becomes possible, and the capacity of the cell as a whole can be improved.

As the material for the gas barrier layer employed in the laminated film, a foil of a metal such as aluminum, iron, copper, nickel, titanium, molybdenum or gold, a foil of an alloy such as stainless steel or hastelloy, or a thin film of a metal oxide such as silicon dioxide or aluminum oxide, may be used. Preferred is an aluminum foil which is light in weight and excellent in workability.

As the resin to be used for the resin layer, various types of sheet-form synthetic resins such as thermoplastics, thermoplastic elastomers, thermosetting resins or plastic alloys may be used. These resins include ones mixed with a bulking agent such as a filler.

Figure 12:
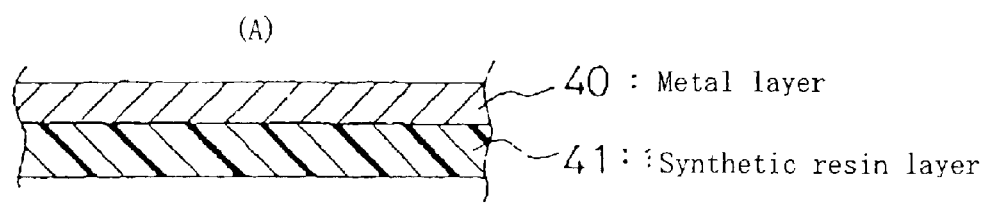
FIG. 12: Each of FIGS. (A) and (B) is a vertical cross-sectional view illustrating an example of a composite member constituting a sheathing member.
Figure 12:
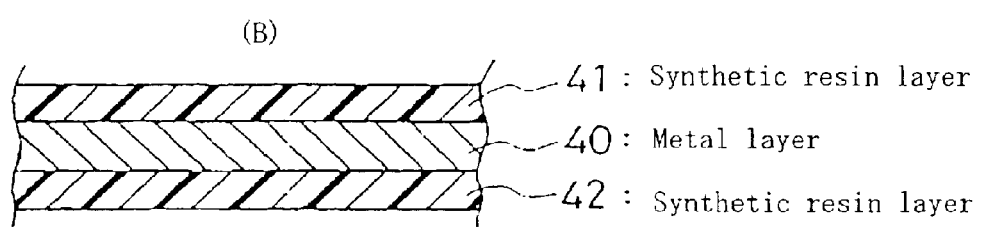

As a specific construction of the laminated film, as illustrated in FIG. 12(A), one having a gas barrier layer 40 and a resin layer 41 laminated, may be used. Further, a more preferred laminated film is a three layer laminate, as illustrated in FIG. 12(B), wherein a synthetic resin layer 41 functioning as an external protection layer, is laminated on the external surface of a gas barrier layer 40, and a synthetic resin layer 42 functioning as an internal protection layer for preventing a corrosion caused by the electrolyte and preventing the contact of the gas barrier layer with the cell element, and protecting the gas barrier layer, is laminated on the inner surface of the gas barrier layer 40 to form this three layer laminate.

In this case, the resin used for the external protection layer is preferably a resin excellent in chemical resistance or in mechanical strength, such as polyethylene, polypropylene, modified polyolefin, ionomer, non-crystalline polyolefin, polyethylene terephthalate or polyamide.

For the internal protection layer, a synthetic resin having chemical resistance is used. For example, polyethylene, polypropylene, modified polyolefin, ionomer or an ethylene-vinyl acetate copolymer may be used.

Figure 13:
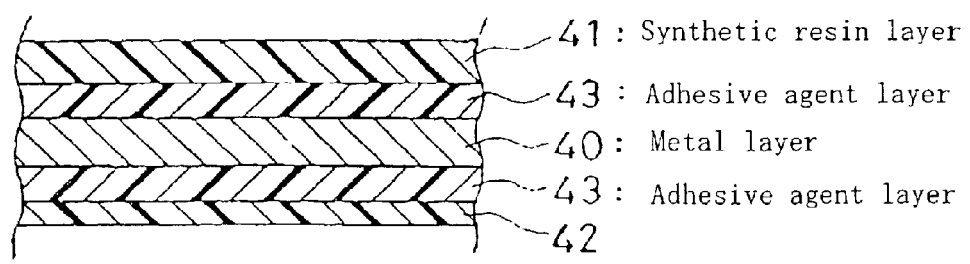
FIG. 13: A vertical cross-sectional view illustrating another example of the composite material constituting a sheathing member.

Further, the laminated film is preferred since, as illustrated in FIG. 13, it is also possible to provide an adhesive layer 43 between the gas barrier layer 40 and the synthetic resin layer 41 which is for forming a protection layer, and between the gas barrier layer 40 and the synthetic resin layer 42 which is for forming a corrosion resisting layer. Further, in order to bond the sheathing members to each other, an adhesive layer made of a resin such as polyethylene or polypropylene, which can be deposited on the innermost surface of the composite member, may be provided. The casing is formed by employing any of these metals, synthetic resins or composite members. The casing may be formed by fusion bonding the peripheral area of a film-form member, and may also be formed by drawing a sheet-form member by vacuum forming, pressure forming, press molding or the like. Further, it may also be formed by injection molding of the synthetic resin. When the injection molding is used, the gas barrier layer is usually formed by e.g. sputtering.

The receiving portion, which is a recess of the sheathing member, can be formed by e.g. drawing.

The sheathing member is preferably one having a film form, since it is easy to process.

The thickness of the sheathing member is usually at least 0.01 $\mu$m, preferably at least 0.02 $\mu$m, more preferably at least 0.05 $\mu$m, and usually at most 1 mm, preferably at most 0.5 mm, more preferably at most 0.3 mm, still more preferably at most 0.2 mm, most preferably at most 0.15 mm. The thinner the thickness, the smaller and the lighter the cell can be made, and the more effective the present invention becomes. However, if it is too thin, it tends to be difficult to impart sufficient rigidity, or the sealing performance is likely to deteriorate.

The thickness of the entire lithium secondary cell having the cell element accommodated in the casing, is usually at most 5 mm, preferably at most 4.5 mm, more preferably at most 4 mm. The present invention is particularly effective to such a thin type lithium secondary cell. However, the cell having too thin thickness is likely to have too small a capacity, or is difficult to produce. Accordingly, it is usually at least 0.5 mm, preferably at least 1 mm, more preferably at least 2 mm.

EXAMPLES

Now, the present invention will be described in further detail with reference to Examples. However, the present invention is by no means restricted to such specific Examples, and can be modified optionally and embodied within the range of not changing the gist. Here, "parts" in the composition means parts by weight (wt %).

Example 1

For Producing Positive Electrode 90 parts of lithium-cobalt compound oxide (LiCoO$_2$), 5 parts of acetylene black, 5 parts of polyvinylidene fluoride and 80 parts of N-methyl-2-pyrrolidone were kneaded by a kneading machine for two hours to form positive electrode coating material 1.

Then, the above-mentioned positive electrode coating material 1 was coated on an aluminum foil current collector having a thickness of 20 $\mu$m by extrusion type die coating, and dried to form a porous film having an active material fixed on the current collector by a binder. Then, an electrode sheet was produced by compaction treatment using a roll press (calendar). Thereafter, from the electrode sheet, an electrode was cut out in a rectangular shape to obtain positive electrode 1. Here, the cutting was carried out so that a part of the current collector (the active material layer was not present on this part) protruded from the rectangular portion, and the protruded portion thus obtained was used as the positive electrode tab.

Example 2

For Producing Positive Electrode

Positive electrode 2 was obtained in the same manner as in Example 1 for producing positive electrode, except that positive electrode coating material 2 using 45 parts of lithium-cobalt compound oxide and 45 parts of lithium-nickel compound oxide (LiNi$_{0.82}$Co$_{0.15}$Al$_{0.03}$O$_2$) instead of 90 parts of lithium-cobalt compound oxide, was used.

Example 3

For Producing Positive Electrode

Positive electrode 3 was obtained in the same manner as in Example 1 for producing positive electrode, except that positive electrode coating material 3 using 27 parts of lithium-cobalt compound oxide and 63 parts of lithium-nickel compound oxide, was used in Example 2 for producing positive electrode.

Example

For Producing Negative Electrode 90 parts of graphite (particle diameter: 15 $\mu$m), 10 parts of polyvinylidene fluoride and 100 parts of N-methyl-2-pyrrolidone were kneaded by a kneading machine for two hours to obtain a negative electrode coating material.

Then, the above-mentioned negative electrode coating material was coated on a copper foil current collector having a thickness of 20 $\mu$m, by extrusion type die coating, and dried to obtain a porous film having an active material fixed on the current collector by a binder. Then, an electrode sheet was produced by applying compaction treatment by a roll press (calendar). Thereafter, from the electrode sheet an electrode was cut out in a rectangular shape to obtain negative electrode 1. Here, the cutting was carried out so that a part of the current collector (the active material layer was not present on this part) protruded from the rectangular portion, and the protruded portion obtained was used as the negative electrode tab.

Example 1

For Producing Electrolyte Precursor Solution 902 parts of a mixed solution of ethylene carbonate and propylene carbonate (volume proportion; ethylene carbonate:propylene carbonate=1:1) containing 1M concentration of LiPF$_6$, 23 parts of phenyl ether, 4.6 parts of a fluorine-type surface active agent (perfluoroalkyl sulfonic imide-ethylene oxide adduct, trade name: Megafac F142P, manufactured by Dainippon Ink & Chemicals, Incorporated), 44 parts of tetraethylene glycol diacrylate, 22 parts of polyethyleneoxide triacrylate, 2 parts of a polymerization initiator and 9 parts of an additive (succinic anhydride) were mixed and stirred for dissolution to form electrolyte precursor solution 1.

Example 2

For Producing Electrolyte Precursor Solution

Electrolyte precursor solution 2 was produced in the same manner as in Example 1 for producing electrolyte precursor solution, except that the amount of the mixed solution of ethylene carbonate and propylene carbonate containing 1M concentration of $LiPF_6$, and the amount of phenyl ether, were changed to be 878 parts and 47 parts, respectively.

Example 3

For Producing Electrolyte Precursor Solution

Electrolyte precursor solution 3 was produced in the same manner as in Example 1 for producing electrolyte precursor solution, except that the amount of the mixed solution of ethylene carbonate and propylene carbonate containing 1M concentration of $LiPF_6$, and the amount of phenyl ether, were changed to be 869 parts and 56 parts, respectively.

Example 4

For Producing Electrolyte Precursor Solution

Electrolyte precursor solution 4 was produced in the same manner as in Example 1 for producing electrolyte precursor solution, except that the amount of the mixed solution of ethylene carbonate and propylene carbonate containing 1M concentration of LiPF6, and the amount of phenyl ether, were changed to be 855 parts and 70 parts, respectively.

Example 5

For Producing Electrolyte Precursor Solution

Electrolyte precursor solution 5 was produced in the same manner as in Example 1 for of producing electrolyte precursor solution, except that the amount of the mixed solution of ethylene carbonate and propylene carbonate containing 1M concentration of $LiPF_6$, was changed to be 925 parts, and phenyl ether was not used.

Example 6

For Producing Electrolyte Precursor Solution

Electrolyte precursor solution 6 was produced in the same manner as in Example 1 for producing electrolyte precursor solution, except that the amount of the mixed solution of ethylene carbonate and propylene carbonate containing 1M concentration of $LiPF_6$, and the amount of phenyl ether, were changed to be 925 parts and 20 parts, respectively.

Example 7

For Producing Electrolyte Precursor Solution

Electrolyte precursor solution 7 was produced in the same manner as in Example 1 for producing electrolyte precursor solution, except that the amount of the mixed solution of ethylene carbonate and propylene carbonate containing 1M concentration of $LiPF_6$, and the amount of phenyl ether, were changed to be 925 parts and 30 parts, respectively.

Example 8

For Producing Electrolyte Precursor Solution

Electrolyte precursor solution 8 was produced in the same manner as in Example 1 for producing the electrolyte precursor solution, except that the amount of the mixed solution of ethylene carbonate and propylene carbonate containing 1M concentration of $LiPF_6$, and the amount of phenyl ether, were changed to be 925 parts and 40 parts, respectively.

Example 9

For Producing Electrolyte Precursor Solution

Electrolyte precursor solution 9 was produced in the same manner as in Example 1 for producing the electrolyte precursor solution, except that the amount of the mixed solution of ethylene carbonate and propylene carbonate containing 1M concentration of $LiPF_6$, and the amount of phenyl ether, were changed to be 925 parts and 60 parts, respectively.

Example 10

For Producing Electrolyte Precursor Solution

Electrolyte precursor solution 10 was produced in the same manner as in Example 1 for producing electrolyte precursor solution, except that the amount of the mixed solution of ethylene carbonate and propylene carbonate containing 1M concentration of $LiPF_6$, and the amount of phenyl ether, were changed to be 925 parts and 100 parts, respectively.

Examples 1 to 8 and Comparative Examples 1 to 3

The positive electrode as identified in Table 1 and the negative electrode, were coated with the electrolyte precursor solution as identified in Table 1, and these electrodes were laminated with a spacer interposed, made of a polyethylene porous film separately soaked with the same electrolyte precursor solution (having a dimension larger than the rectangular portion of the positive electrode and the negative electrode to form a protrusion therefrom). This was heated for 10 minutes to solidify the electrolyte, whereby a unit cell element having the positive electrode, the negative electrode and the non-fluid electrolyte, was produced. A plurality of such unit cell elements thus obtained were stacked in the direction of the thickness, so that the positive electrode tabs and the negative electrode tabs of the respective cell elements, respectively, overlapped, then the positive electrode tabs and the negative electrode tabs were, respectively, bundled to form terminals, and leads to take out electric currents, were bonded to the respective terminals, to form a cell element. Thereafter, the cell element was accommodated as illustrated in FIG. 5, by employing a laminated film (thickness: 100 $\mu$m) provided with synthetic resin layers on both sides of an aluminum layer (inside: polyethylene, outside: polyamide), then the laminated film was sealed by vacuum sealing, and the sealed portions, except the side from which the leads were led out, were folded along the side surface of the cell sheathing member to obtain a flat plate-shaped lithium secondary cell (thickness: 3.7 mm).

The capacity of the cell thus obtained, was measured. The result is shown in Table 1.

Further, the cycle characteristics of the cell thus obtained, was evaluated. Namely, charging and discharging were repeated 300 cycles at 25° C., with a charging final voltage of 4.2V and a discharging final voltage of 2.7v, and the ratio of the discharge capacity of the 300th cycle against the discharge capacity of the first cycle, namely the discharge capacity maintaining rate, was calculated to evaluate the cycle characteristics. The result is shown in Table 1.

In Examples 5 to 8 and Comparative Examples 2 to 3, after the cell element was accommodated in the sheathing member and before sealing by vacuum sealing, a proper amount of a mixed solution comprising 133 parts of tetraethylene glycol diacrylate, 67 parts of polyethyleneoxide triacrylate and 1 part of a polymerization initiator, was injected to the vicinity of the electrode terminal portions. Further, after the sealing by vacuum sealing, the cell was heated at 90° C. for 3 minutes to fix the terminal portions.

From the results shown in Table 1, it is evident that the cycle characteristics of the cell are improved when the compound represented by the formula (1) is incorporated in the electrolyte.

Figure 19:
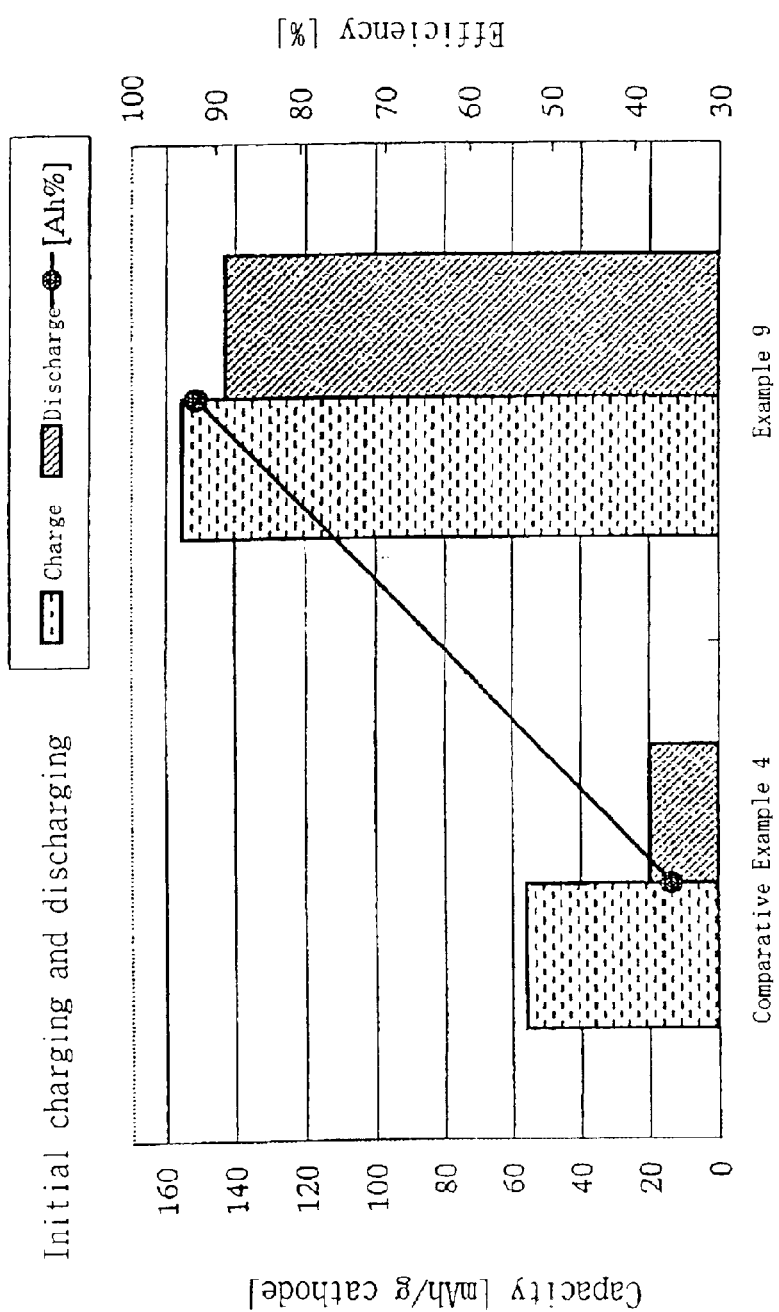
FIG. 19: A graph showing the initial charge-discharge capacity and the initial efficiency in Example 9 and in Comparative Example 4.

Example 4, were measured, and the initial efficiency (discharging capacity/charging capacity*100) was calculated. The results are shown in FIG. 19.

Figure 20:
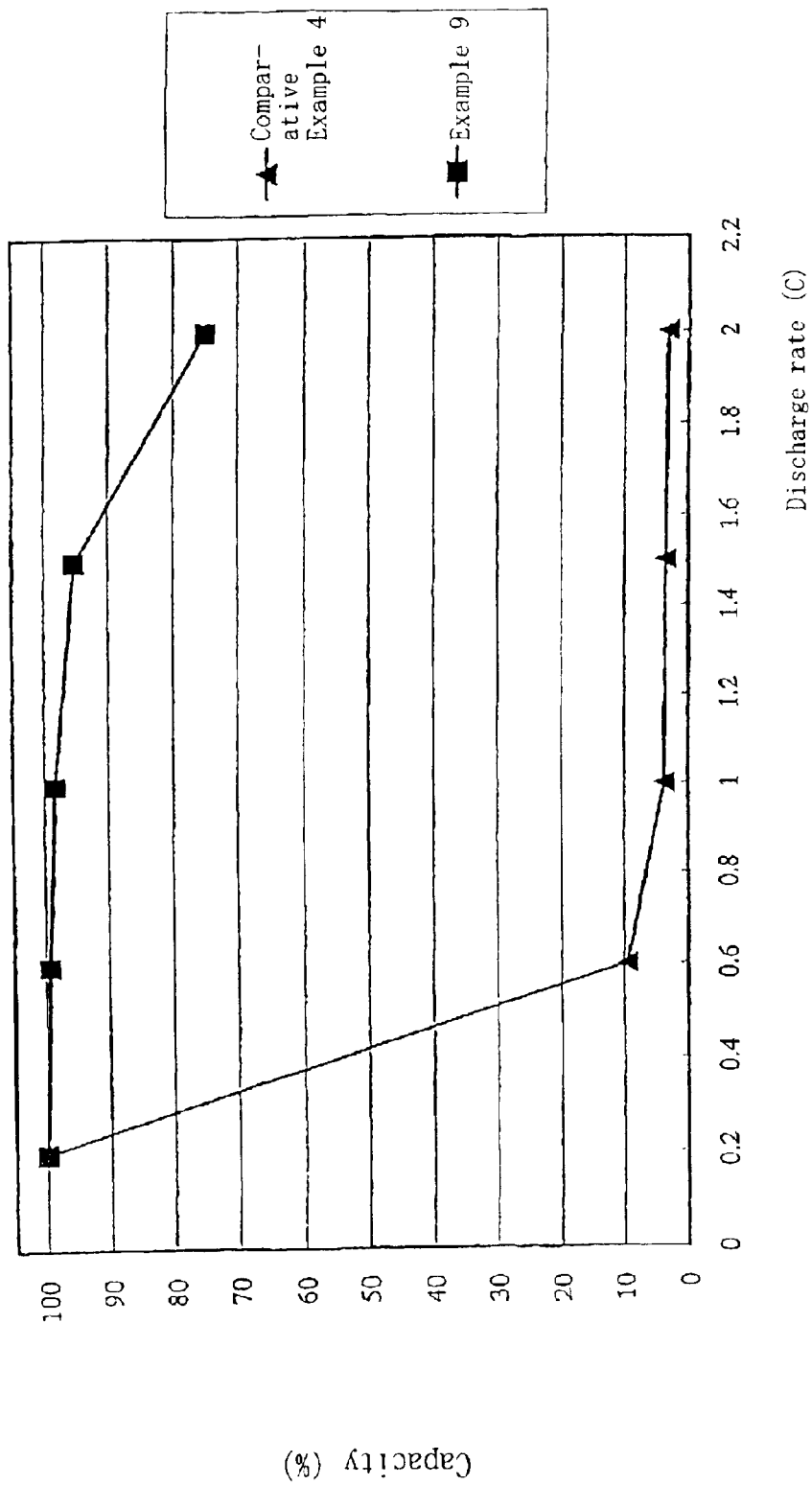
FIG. 20: A graph showing the rate characteristics in Example 9 and in Comparative Example 4.

Further, the capacity of the cell thus obtained, was measured under various discharging rate conditions to evaluate the rate characteristics. The relative capacities under the discharging rates of 0.6C, 1C, 1.5C and 2C, are shown in FIG. 20, on the basis that the capacity under the discharging rate of C/5 is 100.

By incorporating a fluorine-type surface active agent, like phenyl ether, to the electrolyte, the electrolyte becomes easy to be impregnated into the electrodes or into the spacers. Accordingly, in the lithium secondary cell of Comparative Example 4 without containing phenyl ether and a fluorine-type surface active agent, impregnation of the electrolyte into the electrodes or into the spacers is not performed sufficiently. As a result, the initial efficiency is very low around 3.5% (FIG. 19), the discharging capacity under the discharging rate of from 0.6 to 2C is at most 10% of the discharging capacity under the discharging rate of 0.2C, and the rate characteristics are also far below the level for

TABLE 1

|  | Type of positive electrode | Type of electrolyte precursor solution | Amount of phenyl ether (wt %, based on elecrolytic solution) | Cell capacity (mAh) | Cycle characteristics (%) |
| --- | --- | --- | --- | --- | --- |
| Ex. 1 | Positive electrode 1 | Electrolyte precursor solution 1 | 2.5 | About 650 | 82 |
| Ex. 2 | Positive electrode 1 | Electrolyte precursor solution 2 | 5.1 | About 650 | 82 |
| Ex. 3 | Positive electrode 1 | Electrolyte precursor solution 3 | 6.1 | About 650 | 83 |
| Ex. 4 | Positive electrode 1 | Electrolyte precursor solution 4 | 7.6 | About 650 | 83 |
| Comp. Ex. 1 | Positive electrode 1 | Electrolyte precursor solution 5 | 0 | About 650 | 76 |
| Ex. 5 | Positive electrode 1 | Electrolyte precursor solution 2 | 5.1 | About 650 | 82 |
| Ex. 6 | Positive electrode 1 | Electrolyte precursor solution 3 | 6.1 | About 650 | 83 |
| Ex. 7 | Positive electrode 1 | Electrolyte precursor solution 4 | 7.6 | About 650 | 83 |
| Comp. Ex. 2 | Positive electrode 1 | Electrolyte precursor solution 5 | 0 | About 650 | 76 |
| Ex. 8 | Positive electrode 2 | Electrolyte precursor solution 2 | 5.1 | About 700 | 87 |
| Comp. Ex. 3 | Positive electrode 2 | Electrolyte precursor solution 5 | 0 | About 700 | 78 |

Example 9

A lithium secondary cell was produced in the same manner as in Example 3, except that without stacking a plurality of the unit cell elements, a single unit cell element was accommodated in the casing, and the fluorine-type surface active agent was not used in the process of producing electrolyte precursor solution 3.

Comparative Example 4

A lithium secondary cell was produced in the same manner as in Comparative Example 1, except that without stacking a plurality of the unit cell elements, a single unit cell element was accommodated in the casing, and the fluorine-type surface active agent was not used in the process of producing electrolyte precursor solution 5.

The initial charging capacities and discharging capacities (0.2C) of the cells obtained in Example 9 and Comparative practical use (FIG. 20). On the other hand, by incorporating only phenyl ether to the electrolyte, the initial efficiency becomes at least 90% (FIG. 19), and the discharging capacity under the discharging rate of from 0.6 to 1.5C becomes at least 95% of the discharging capacity under the discharging rate of 0.2C, and further, the discharging capacity under the discharging rate of 2C becomes at least 75% of the discharging rate under the discharging condition of 0.2C, and the rate characteristics also become good (FIG. 20). This obviously means that by the incorporation of phenyl ether to the electrolyte, impregnation of the electrolyte into the electrodes and the spacers is sufficiently performed.

Meanwhile, in Comparative Example 4, if a sufficient time is taken for impregnation of the electrolyte into the electrodes and the spacers, the characteristics may become closer to the values in Example 9. However, to spend a long time for the impregnation is disadvantageous in the industrial production.

Examples 10 to 14, and Comparative Example 5

A unit cell element was produced in the same manner as in Example 1, by using a positive electrode as identified in Table 2 and a negative electrode, and employing an electrolyte precursor solution as identified in Table 2, and this single unit cell element was accommodated in the casing to produce a lithium secondary cell. The cycle characteristics of the lithium secondary cell were evaluated. Namely, charging and discharging were repeated 300 cycles at 25° C., under a charging final voltage of 4.2V and a discharging final voltage of 3.0V, and the ratio of the discharging capacity of the 300th cycle against the discharging capacity of the first cycle, which is the maintaining rate of discharging capacity, was calculated to evaluate the cycle characteristics. The result is shown in Table 2.

TABLE 2

| | Type of positive electrode | Type of electrolyte precursor solution | Amount of phenyl ether (wt %, based on electrolytic solution) | Cycle characteristics (%) |
|---|---|---|---|---|
| Ex. 10 | Positive electrode 3 | Electrolyte precursor solution 6 | 2.1 | 83.3 |
| Ex. 11 | Positive electrode 3 | Electrolyte precursor solution 7 | 3.1 | 82.8 |
| Ex. 12 | Positive electrode 3 | Electrolyte precursor solution 8 | 4.1 | 85.7 |
| Ex. 13 | Positive electrode 3 | Electrolyte precursor solution 9 | 6.1 | 91.4 |
| Ex. 14 | Positive electrode 3 | Electrolyte precursor solution 10 | 9.8 | 90.8 |
| Comp. Ex. 5 | Positive electrode 3 | Electrolyte precursor solution 5 | 0 | 79.4 |

From the result shown in Table 2, it is evident that the cycle characteristics are improved by incorporating phenyl ether to the electrolytic solution, even in the case where the mixture ratio of lithium-cobalt compound oxide and lithium-nickel compound oxide is made to be 30% or 70%. Further, it is evident that as the content of phenyl ether increases, the cycle characteristics will further improve.

INDUSTRIAL APPLICABILITY

According to the present invention, a lithium secondary cell having improved cell characteristics such as initial efficiency, cycle characteristics, rate characteristics, capacity and safety, can be provided. Especially, it is possible to remarkably improve the cycle characteristics of the lithium secondary cell employing a casing having a variable shape. And, not only that, by the improvement of the impregnation property of the electrolyte, it is possible to provide a lithium secondary cell having good initial efficiency and rate characteristics.

The present invention has been described in detail with reference to specific embodiments, but, it is obvious for the person skilled in the art that various changes and modifications are possible without departing from the intension and the scope of the present invention.

The present invention is based on a Japanese Patent Application filed on Dec. 27, 2000 (JP-2000-397318), and the entirety is referred by a citation.

What is claimed is:

1. A lithium secondary cell comprising a casing having a variable shape, and a cell element having a positive electrode, a negative electrode and an electrolyte, sealed in the casing, wherein the electrolyte contains a non-fluid electrolyte, and wherein a compound represented by following formula (1) is contained in the lithium secondary cell:

$$A1\text{-}X\text{-}A2 \tag{1}$$

(wherein X is a Group VI element in the periodic table, and A1 and A2 represent an aromatic group, provided that A1 and A2 may be the same or different, and may be connected to each other to constitute a ring), wherein the electrolyte contains an electrolytic solution, and wherein the compound represented by the formula (1) is contained in an amount of from 1 to 15 wt % based on the weight of the electrolytic solution.

2. The lithium secondary cell according to claim 1, wherein the compound represented by the formula (1) is contained in an amount larger than 5 wt % and at most 7.5 wt % based on the weight of the electrolytic solution.

* * * * *